(12) United States Patent
Fukumori

(10) Patent No.: US 11,459,062 B2
(45) Date of Patent: Oct. 4, 2022

(54) BICYCLE DERAILLEUR

(71) Applicant: SHIMANO Inc., Sakai (JP)

(72) Inventor: Tsuyoshi Fukumori, Sakai (JP)

(73) Assignee: Shimano Inc., Sakai (JP)

( * ) Notice: Subject to any disclaimer, the term of this patent is extended or adjusted under 35 U.S.C. 154(b) by 247 days.

(21) Appl. No.: 16/563,506

(22) Filed: Sep. 6, 2019

(65) Prior Publication Data

US 2021/0070394 A1 Mar. 11, 2021

(51) Int. Cl.
| | |
|---|---|
| *B62M 9/122* | (2010.01) |
| *B62M 9/1248* | (2010.01) |
| *B62M 25/08* | (2006.01) |
| *B62M 6/45* | (2010.01) |
| *B62M 9/124* | (2010.01) |

(52) U.S. Cl.
CPC ............. *B62M 9/122* (2013.01); *B62M 6/45* (2013.01); *B62M 9/1248* (2013.01); *B62M 25/08* (2013.01); *B62M 2009/12406* (2013.01)

(58) Field of Classification Search
CPC .... B62M 9/122; B62M 9/1248; B62M 25/08; B62M 2009/12406
USPC .......................................................... 701/22
See application file for complete search history.

(56) References Cited

U.S. PATENT DOCUMENTS

| | | | | |
|---|---|---|---|---|
| 6,964,203 | B2 * | 11/2005 | Crasset ................. | B62K 19/34 73/854 |
| 10,640,171 | B2 * | 5/2020 | Hamed ................. | B62M 25/08 |
| 2002/0014366 | A1 * | 2/2002 | Turner ................. | B62K 19/40 180/220 |
| 2003/0220163 | A1 * | 11/2003 | Yin ........................ | B62M 25/08 474/80 |
| 2016/0152301 | A1 * | 6/2016 | Bortoli .................. | B62M 9/124 474/82 |
| 2017/0341708 | A1 * | 11/2017 | Bernardele ............ | B62M 9/132 |
| 2018/0043968 | A1 * | 2/2018 | Sala ....................... | B62K 23/06 |
| 2018/0127059 | A1 * | 5/2018 | Lin ........................ | B62M 9/132 |
| 2018/0180640 | A1 * | 6/2018 | Miglioranza ............ | G01P 3/66 |
| 2018/0237104 | A1 * | 8/2018 | Pasqua .................. | B62M 9/122 |
| 2020/0262516 | A1 * | 8/2020 | Hahn ..................... | B62M 25/08 |
| 2020/0269954 | A1 * | 8/2020 | Mizutani ................ | B62M 9/122 |
| 2020/0283095 | A1 * | 9/2020 | Nichols ................. | B62M 9/122 |

\* cited by examiner

*Primary Examiner* — Thomas Randazzo
*Assistant Examiner* — Michael E Butler
(74) *Attorney, Agent, or Firm* — Alleman Hall Creasman & Tuttle LLP

(57) ABSTRACT

A bicycle derailleur comprises a base member, a movable member, a pulley assembly, a rotational-force adjustment structure, an electric actuator, and a controller. The rotational-force adjustment structure is at least partly disposed between the movable member and the pulley assembly so as to apply resistance to rotation of the pulley assembly relative to the movable member. The electric actuator is configured to operate the rotational-force adjustment structure. The controller is configured to control the electric actuator based on a driving-force related information.

20 Claims, 15 Drawing Sheets

BICYCLE DERAILLEUR

TECHNICAL FIELD

The technology disclosed herein relates to a bicycle derailleur.

BACKGROUND

Bicycling is becoming an increasingly more popular form of recreation as well as a means of transportation. Moreover, bicycling has become a very popular competitive sport for both amateurs and professionals.

Whether the bicycle is used for recreation, transportation or competition, the bicycle industry is constantly improving the various components of the bicycle. One bicycle component that has been extensively redesigned is a bicycle derailleur. The bicycle derailleur is mounted to a bicycle frame.

SUMMARY

In accordance with a first aspect of the present invention, a bicycle derailleur comprises a base member, a movable member, a pulley assembly, a rotational-force adjustment structure, an electric actuator, and a controller.

The base member is configured to be attached to a bicycle frame. The movable member is configured to move relative to the base member. The pulley assembly is rotatably coupled to the movable member about a first pivot axis.

The rotational-force adjustment structure is at least partly disposed between the movable member and the pulley assembly so as to apply resistance to rotation of the pulley assembly relative to the movable member. The electric actuator is configured to operate the rotational-force adjustment structure. The controller is configured to control the actuator based on a driving-force related information.

With the bicycle derailleur according to the first aspect, the rotational-force adjustment structure applies the resistance to rotation of the pulley assembly relative to the movable member. The electric actuator operates the rotational-force adjustment structure. The controller controls the electric actuator based on the driving-force related information.

Thereby, the bicycle derailleur is capable of changing tension of a bicycle chain. In other words, the bicycle derailleur is capable of smoothly performing shift transmission.

In accordance with a second aspect of the present invention, the bicycle derailleur according to the first aspect is configured so that the electric actuator operates the rotational-force adjustment structure so as to adjust the resistance applied by the rotational-force adjustment structure.

With the bicycle derailleur according to the second aspect, the bicycle derailleur is capable of smoothly performing shift transmission.

In accordance with a third aspect of the present invention, the bicycle derailleur according to the first or second aspect is configured so that the pulley assembly includes at least one pulley configured to engage with a bicycle chain.

With the bicycle derailleur according to the third aspect, the bicycle derailleur is capable of smoothly performing shift transmission.

In accordance with a fourth aspect of the present invention, the bicycle derailleur according to the third aspect is configured so that the at least one pulley includes a first pulley and a second pulley. The first pulley is disposed closer to the movable member than the second pulley.

With the bicycle derailleur according to the fourth aspect, the bicycle derailleur is capable of smoothly performing shift transmission.

In accordance with a fifth aspect of the present invention, the bicycle derailleur according to the fourth aspect is configured so that the first pulley is rotatable about the first pivot axis.

With the bicycle derailleur according to the fifth aspect, the bicycle derailleur is capable of smoothly performing shift transmission.

In accordance with a sixth aspect of the present invention, the bicycle derailleur according to the fourth aspect is configured so that the first pulley is rotatable about a second pivot axis that is offset from the first pivot axis.

With the bicycle derailleur according to the sixth aspect, the bicycle derailleur is capable of smoothly performing shift transmission.

In accordance with a seventh aspect of the present invention, the bicycle derailleur according to any one of the first to sixth aspects is configured so that the controller controls the electric actuator so that the rotational-force adjustment structure applies a first resistance to the rotation of the pulley assembly relative to the movable member when the driving-force related information relates to a first driving force, and so that the rotational-force adjustment structure applies a second resistance to the rotation of the pulley assembly relative to the movable member when the driving-force related information relates to a second driving force.

The first driving force is larger than the second driving force. The first resistance is larger than the second resistance.

With the bicycle derailleur according to the seventh aspect, the bicycle derailleur is capable of performing shift transmission smoothly and appropriately.

In accordance with an eighth aspect of the present invention, the bicycle derailleur according to any one of the first to seventh aspects is configured so that the controller controls the electric actuator so that the rotational-force adjustment structure applies a first resistance to the rotation of the pulley assembly relative to the movable member when the driving-force related information is larger than a predetermined threshold.

With the bicycle derailleur according to the eighth aspect, the bicycle derailleur is capable of performing shift transmission smoothly and appropriately.

In accordance with a ninth aspect of the present invention, the bicycle derailleur according to the eighth aspect is configured so that the controller controls the electric actuator so that the rotational-force adjustment structure applies a second resistance to the rotation of the pulley assembly relative to the movable member when the driving-force related information is equal to or smaller than the predetermined threshold. The first resistance is larger than the second resistance.

With the bicycle derailleur according to the ninth aspect, the bicycle derailleur is capable of performing shift transmission smoothly and appropriately.

In accordance with a tenth aspect of the present invention, the bicycle derailleur according to any one of the first to ninth aspects is configured so that the pulley assembly is rotatable relative to the movable member in a first rotational direction and in a second rotational direction that is opposite to the first rotational direction. The rotational-force adjustment structure applies the resistance to the rotation of the pulley assembly relative to the movable member in the first rotational direction.

With the bicycle derailleur according to the tenth aspect, the bicycle derailleur is capable of performing shift transmission smoothly and appropriately.

In accordance with an eleventh aspect of the present invention, the bicycle derailleur according to the tenth aspect is configured so that the rotational-force adjustment structure does not apply resistance to the rotation of the pulley assembly relative to the movable member in the second rotational direction.

With the bicycle derailleur according to the eleventh aspect, the bicycle derailleur is capable of performing shift transmission smoothly and appropriately.

In accordance with a twelfth aspect of the present invention, the bicycle derailleur according to any one of the first to eleventh aspects is configured so that the rotational-force adjustment structure includes a biasing member.

With the bicycle derailleur according to the twelfth aspect, the bicycle derailleur is capable of smoothly performing shift transmission with a conventional configuration.

In accordance with a thirteenth aspect of the present invention, the bicycle derailleur according to the twelfth aspect is configured so that the biasing member has a first end and a second end. The first end is operatively coupled to the movable member and disposed closer to the movable member than the second end. The second end is operatively coupled to the pulley assembly and disposed closer to the pulley assembly than the first end.

With the bicycle derailleur according to the thirteenth aspect, the bicycle derailleur is capable of smoothly performing shift transmission with a conventional configuration.

In accordance with a fourteenth aspect of the present invention, the bicycle derailleur according to the thirteenth aspect is configured so that the electric actuator is configured to move one of the first end and the second end relative to the other of the first end and the second end so that the resistance is applied to the rotation of the pulley assembly relative to the movable member.

With the bicycle derailleur according to the fourteenth aspect, the bicycle derailleur is capable of smoothly performing shift transmission with a conventional configuration.

In accordance with a fifteenth aspect of the present invention, the bicycle derailleur according to any one of the first to fourteenth aspects is configured so that the rotational-force adjustment structure includes a one-way clutch mechanism and a resistance applying member. The one-way clutch mechanism includes a first member and a second member facing the first member and is configured to permit relative movement between the first member and the second member in a first direction and to inhibit the relative movement between the first member and the second member in a second direction that is opposite to the first direction. The resistance applying member is configured to indirectly or directly apply the resistance to one of the first member and the second member.

With the bicycle derailleur according to the fifteenth aspect, the bicycle derailleur is capable of performing shift transmission smoothly and appropriately.

In accordance with a sixteenth aspect of the present invention, the bicycle derailleur according to the fifteenth aspect is configured so that the electric actuator is configured to operate the resistance applying member so that the resistance is applied to the rotation of the pulley assembly relative to the movable member.

With the bicycle derailleur according to the sixteenth aspect, the bicycle derailleur is capable of performing shift transmission smoothly and appropriately.

In accordance with a seventeenth aspect of the present invention, the bicycle derailleur according to any one of the first to sixteenth aspects is configured so that the resistance includes a third resistance and a fourth resistance. The controller controls the actuator so that the rotational-force adjustment structure applies the third resistance to the rotation of the pulley assembly relative to the movable member when the bicycle chain engages with a smaller rear sprocket, and so that the rotational-force adjustment structure applies the fourth resistance to the rotation of the pulley assembly relative to the movable member when the bicycle chain engages with a larger rear sprocket. The third resistance is larger than the fourth resistance.

With the bicycle derailleur according to the seventeenth aspect, the bicycle derailleur is capable of performing shift transmission smoothly and appropriately.

In accordance with an eighteenth aspect of the present invention, the bicycle derailleur according to any one of the first to sixteenth aspects is configured so that the resistance includes a fifth resistance and a sixth resistance. The controller controls the electric actuator so that the rotational-force adjustment structure applies the fifth resistance to the rotation of the pulley assembly relative to the movable member during a shifting operation, and so that the rotational-force adjustment structure applies the sixth resistance to the rotation of the pulley assembly relative to the movable member during a non-shifting operation. The fifth resistance is larger than the sixth resistance.

With the bicycle derailleur according to the eighteenth aspect, the bicycle derailleur is capable of performing shift transmission smoothly and appropriately.

In accordance with a nineteenth aspect of the present invention, the bicycle derailleur comprises a base member, a movable member, a pulley assembly, a rotational-force adjustment structure, an electric actuator, and a controller.

The base member is configured to be attached to a bicycle frame. The movable member is configured to move relative to the base member. The pulley assembly is rotatably coupled to the movable member about a first pivot axis. The rotational-force adjustment structure is disposed between the movable member and the pulley assembly.

The electric actuator is configured to operate the rotational-force adjustment structure so as to apply resistance to a rotation of the pulley assembly relative to the movable member. The controller is configured to control the electric actuator so that the rotational-force adjustment structure applies a larger resistance to the rotation of the pulley assembly relative to the movable member when the bicycle chain engages with a smaller rear sprocket, and so that the rotational-force adjustment structure applies a smaller resistance to the rotation of the pulley assembly relative to the movable member when the bicycle chain engages with a larger rear sprocket.

With the bicycle derailleur according to the nineteenth aspect, the bicycle derailleur is capable of performing shift transmission smoothly and appropriately.

In accordance with a twentieth aspect of the present invention, the bicycle derailleur comprises a base member, a movable member, a pulley assembly, a rotational-force adjustment structure, an electric actuator, and a controller.

The base member is configured to be attached to a bicycle frame. The movable member is configured to move relative to the base member. The pulley assembly rotatably is coupled to the movable member about a first pivot axis. The rotational-force adjustment structure is disposed between the movable member and the pulley assembly.

The electric actuator is configured to operate the rotational-force adjustment structure so as to apply resistance to a rotation of the pulley assembly relative to the movable member. The controller is configured to control the electric actuator so that the rotational-force adjustment structure applies a larger resistance to the rotation of the pulley assembly relative to the movable member during a shifting operation, and so that the rotational-force adjustment structure applies a smaller resistance to the rotation of the pulley assembly relative to the movable member during a non-shifting operation.

With the bicycle derailleur according to the twentieth aspect, the bicycle derailleur is capable of performing shift transmission smoothly and appropriately.

BRIEF DESCRIPTION OF THE DRAWINGS

Referring now to the attached drawings, which form a part of this original disclosure.

DETAILED DESCRIPTION OF PREFERRED EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

In this embodiment, the following directional terms "forward", "rearward", "left", "right", "high", "low", "upward" and "downward" as well as any other similar directional terms refer to those directions which are determined on the basis of a rider who sits on a bicycle seat (not shown) of a bicycle with facing a bicycle handlebar (not shown).

First Embodiment

<General Configuration of a Bicycle>

Figure 1:
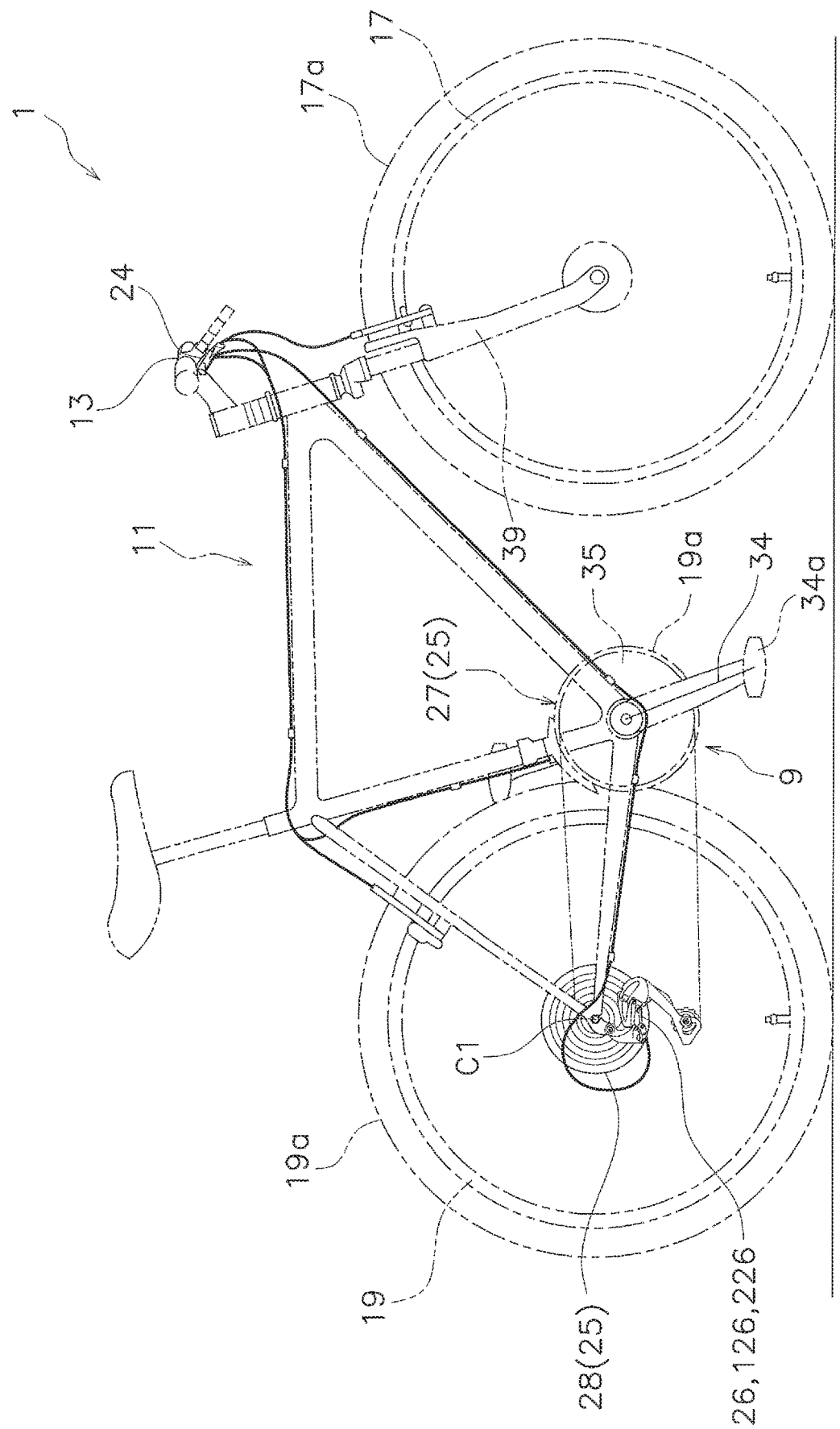
FIG. 1 is a side view of a bicycle incorporating a bicycle derailleur according to the present disclosure.

As shown FIG. 1, a bicycle 1 includes a bicycle chain 9, a bicycle frame 11, a handle 13, front and rear wheels 17, 19, a shifting device 24, a bicycle derailleur 26, a driving portion 25 and a front fork 39.

The front fork 39 is rotatably attached to the bicycle frame 11. The handle 13 is fixed to the front fork 39. The front wheel 17 is rotatably attached to the front fork 39. The rear wheel 19 is rotatably attached to a rear portion of the bicycle frame 11 via a rear hub assembly. A front tire 17a is attached to the front wheel 17. A rear tire 19a is attached to the rear wheel 19.

The shifting device 24 is attached to the handle 13. The shifting device 24 operates the bicycle derailleur 26 via a cable and/or a wireless communication.

The bicycle derailleur 26 is attached to the bicycle frame 11. The bicycle derailleur 26 moves the bicycle chain 9 from one rear sprocket of a rear sprocket assembly 28 to another rear sprocket of the rear sprocket assembly 28 by operating a shifting device 24.

The driving portion 25 includes a crank assembly 27 and the rear sprocket assembly 28.

The crank assembly 27 is rotatably supported on a lower portion of the bicycle frame 11. The crank assembly 27 includes a pair of crank arms 34. A pedal 34a is attached to each of the pair of crank arms 34. The crank assembly 27 further includes at least one front sprocket 35. In this embodiment, the crank assembly 27 includes a front sprocket 35 which engages with the bicycle chain 9. The crank assembly 27 further includes a crank axle.

The rear sprocket assembly 28 includes a rotational center axis C1. The rear sprocket assembly 28 is rotatably attached to the rear hub assembly. The rear sprocket assembly 28 includes a plurality of rear sprockets. The rear sprockets are shown by a simplified description in FIG. 1.

<General Configuration of the Bicycle Derailleur>

Figure 2:
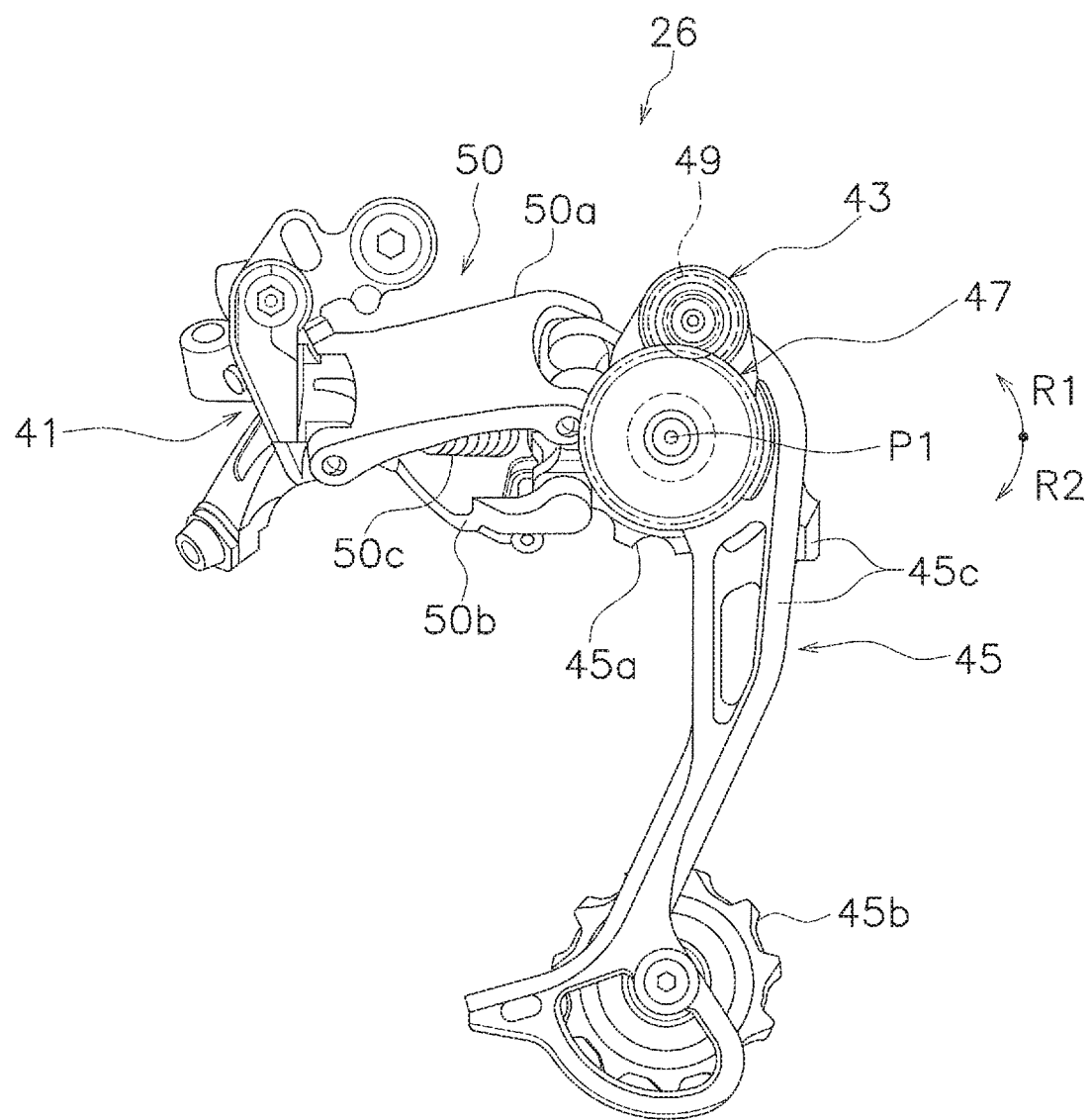
FIG. 2 is a front view from outside of the bicycle derailleur according to a first embodiment of the present disclosure.
Figure 3:
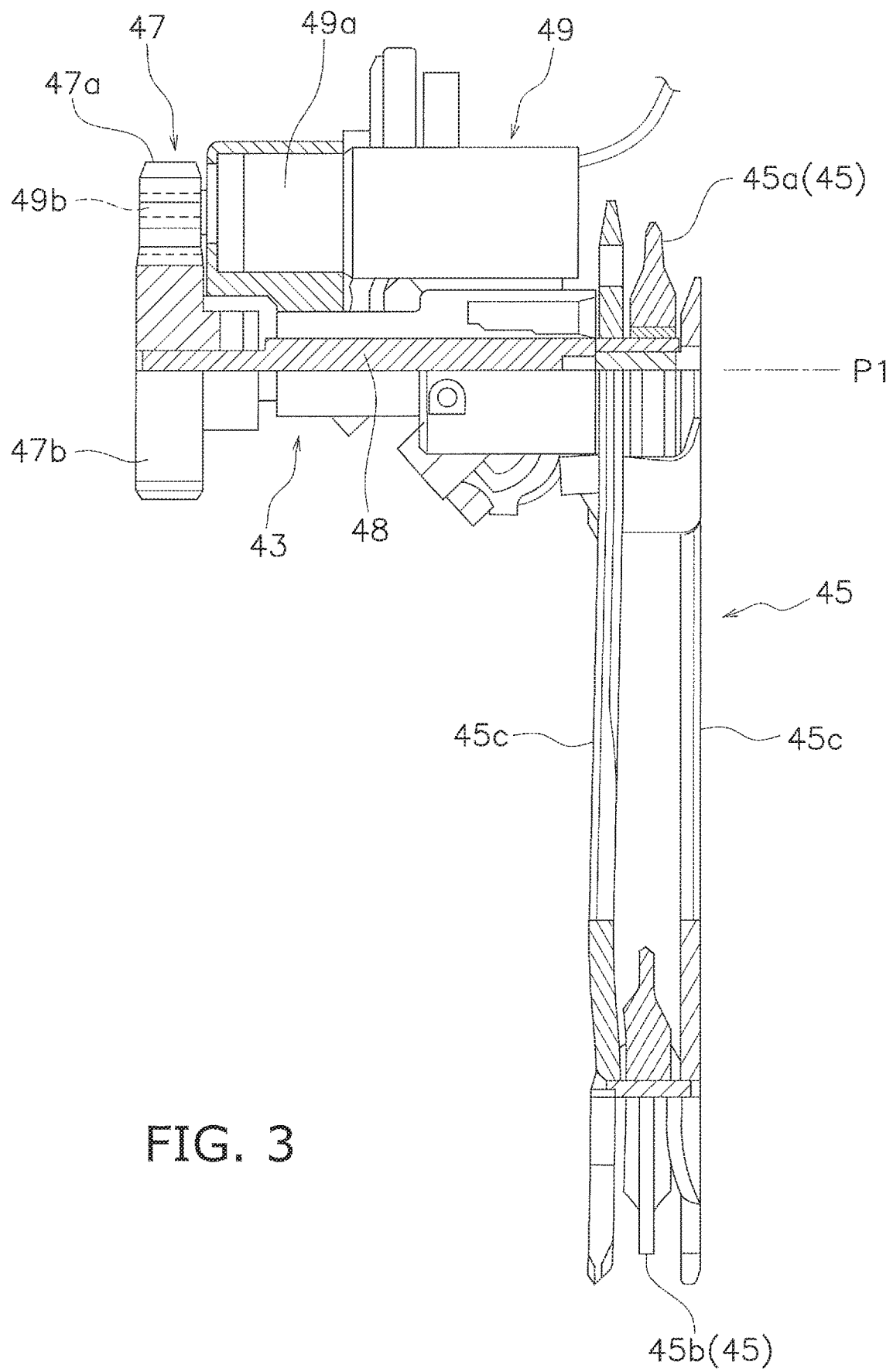
FIG. 3 is a partial cross-sectional view of the bicycle derailleur according to the first embodiment of the present disclosure.

As shown in FIGS. 2 and 3, the bicycle derailleur 26 comprises a base member 41, a movable member 43, a pulley assembly 45, a rotational-force adjustment structure 47, an electric actuator 49, and a controller 51. The bicycle derailleur 26 further comprises a linkage structure 50.

The base member 41 is configured to be attached to the bicycle frame 11. The movable member 43 is configured to move relative to the base member 41. The movable member 43 moves with respect to the base member 41 via the linkage structure 50. The movable member 43 pivotably supports the pulley assembly 45.

The linkage structure 50 is configured to operatively couple the base member 41 to the movable member 43. The linkage structure 50 is disposed between the base member 41 and the movable member 43.

The linkage structure 50 includes a first link member 50a, a second link member 50b, and a coil spring 50c. The first link member 50a is pivotably attached to each of the base member 41 and the movable member 43. The second link member 50b is pivotably attached to each of the base member 41 and the movable member 43.

The coil spring 50c is configured to bias the movable member 43 toward the top side of the rear sprocket assembly 28, for example, toward a smallest sprocket side of the rear sprocket assembly 28. The coil spring 50c can be configured to bias the movable member 43 toward the low side of the rear sprocket assembly 28, for example, toward a largest sprocket side of the rear sprocket assembly 28

The pulley assembly 45 is rotatably coupled to the movable member 43 about a first pivot axis P1. The pulley assembly 45 is rotatable relative to the movable member 43 in a first rotational direction R1 and in a second rotational direction R2 that is opposite to the first rotational direction R1.

The pulley assembly 45 includes at least one pulley configured to engage with a bicycle chain 9. For example, the at least one pulley includes a first pulley 45a and a second pulley 45b. The first pulley 45a corresponds to a guide pulley. The second pulley 45b corresponds to a tension pulley.

The first pulley 45a is disposed closer to the movable member 43 than the second pulley 45b. The first pulley 45a is rotatable about the first pivot axis P1. The first pulley 45a is rotatable about a second pivot axis that is offset from the first pivot axis P1.

The pulley assembly 45 further includes a pair of chain guide plates 45c. The pair of chain guide plates 45c rotatably supports the first pulley 45a and the second pulley 45b. The pair of chain guide plates 45c is rotatably coupled to the movable member 43 about a first pivot axis P1. The pair of chain guide plates 45c is rotatable relative to the movable member 43 in the first rotational direction R1 and in the second rotational direction R2.

As shown in FIG. 3, the rotational-force adjustment structure 47 is at least partly disposed between the movable member 43 and the pulley assembly 45 so as to apply resistance to a rotation of the pulley assembly 45 relative to the movable member 43.

Thereby, the rotational-force adjustment structure 47 can change tension of the bicycle chain 9, when the rotational-force adjustment structure 47 is operated. The chain tension is changed by operation of the rotational-force adjustment structure 47.

For example, the rotational-force adjustment structure 47 applies the resistance to the rotation of the pulley assembly 45 relative to the movable member 43 in the first rotational direction R1.

The rotational-force adjustment structure 47 does not apply resistance to the rotation of the pulley assembly 45 relative to the movable member 43 in the second rotational direction R2.

The rotational-force adjustment structure 47 is at least partly mounted to the movable member 43. For example, the rotational-force adjustment structure 47 is mounted to the movable member 43. The rotational-force adjustment structure 47 includes a pivot shaft 48. The pivot shaft 48 transmits a driving force of the electric actuator 49 to the chain guide plates 45c via a drive gear 47a and a driven gear 47b.

The drive gear 47a is mounted to a motor shaft 49b so that the motor shaft 49b and the drive gear 47a rotate as a unit. The drive gear 47a engages with the pulley assembly driven gear 47b.

The pulley assembly driven gear 47b engages with the chain guide plates 45c. For example, the pulley assembly driven gear 47b engages with the chain guide plates 45c via a pivot shaft 48. The pivot shaft 48 is pivotably supported by the movable member 43. For example, the pivot shaft 48 is pivotably supported by the movable member 43 via a bearing or a sliding bush.

The electric actuator 49 is configured to operate the rotational-force adjustment structure 47. The electric actuator 49 operates the rotational-force adjustment structure 47 so as to adjust the resistance applied by the rotational-force adjustment structure 47.

The electric actuator 49 is configured to operate the rotational-force adjustment structure 47 so as to apply resistance to the rotation of the pulley assembly 45 relative to the movable member 43. The electric actuator 49 can include an actuator body and a reduction structure.

An electric power of the electric actuator 49 is supplied from an electric power supply 46. The electric power supply 46 can be disposed inside of the bicycle derailleur 26 or outside of the bicycle derailleur 26. For example, the electric power supply 46 can be disposed at the inside or outside of one of the base member 41, the linkage structure 50, and the movable member 43. The electric power supply 46 can be disposed on the bicycle frame 11 at a position located away from the bicycle derailleur 26 The electric power supply 46 can be disposed on the bicycle 1.

In some embodiments, the electric actuator 49 includes an electric motor. The electric actuator 49 includes a motor body 49a and the motor shaft 49b. The motor body 49a is mounted to the movable member 43. The motor shaft 49b rotates with respect to the motor body 49a.

In some embodiments, such as when the shifting device 24 operates the bicycle derailleur 26 via the wireless communication, a motor is provided in the bicycle derailleur 26. The motor is different from the electric actuator 49.

<Configuration of Controller>

The controller 51 is configured to control the electric actuator 49 based on a driving-force related information. The driving-force related information is stored on a memory 51a.

The controller 51 is configured to control the electric actuator 49 so that the rotational-force adjustment structure 47 applies a larger resistance to the rotation of the pulley assembly 45 relative to the movable member 43 during a shifting operation.

The controller 51 is configured to control the electric actuator 49 so that the rotational-force adjustment structure 47 applies a smaller resistance to the rotation of the pulley assembly 45 relative to the movable member 43 during a non-shifting operation.

For example, the resistance includes a first resistance and a second resistance. The resistance includes a third resistance and a fourth resistance. The resistance includes a fifth resistance and a sixth resistance.

The resistance includes the larger resistance and the smaller resistance. The smaller resistance is smaller than the larger resistance. The larger resistance includes the first resistance, the third resistance, and the fifth resistance. The smaller resistance includes the second resistance, the fourth resistance, and the sixth resistance. The first resistance is larger than the second resistance. The third resistance is larger than the fourth resistance. The fifth resistance is larger than the sixth resistance. The fifth resistance is used during the shifting operation. The sixth resistance is used during the non-shifting operation.

The resistance includes a reference resistance. The reference resistance can be different from the first to sixth resistances. The reference resistance can be the same as at least one of the second resistance, the fourth resistance, and the sixth resistance.

The controller 51 controls the electric actuator 49 so that the rotational-force adjustment structure 47 applies the first resistance to the rotation of the pulley assembly 45 relative to the movable member 43 when the driving-force related information relates to a first driving force.

The controller 51 controls the electric actuator 49 so that the rotational-force adjustment structure 47 applies the second resistance to the rotation of the pulley assembly 45 relative to the movable member 43 when the driving-force related information relates to a second driving force. The first driving force is larger than the second driving force.

The controller 51 controls the electric actuator 49 so that the rotational-force adjustment structure 47 applies the first resistance to the rotation of the pulley assembly 45 relative to the movable member 43 when the driving-force related information is larger than a predetermined threshold.

For example, the controller 51 controls the electric actuator 49 so that the rotational-force adjustment structure 47 applies the first resistance to the rotation of the pulley assembly 45 relative to the movable member 43 when the first driving force is larger than the predetermined threshold.

The controller 51 controls the electric actuator 49 so that the rotational-force adjustment structure 47 applies the second resistance to the rotation of the pulley assembly 45 relative to the movable member 43 when the driving-force related information is equal to or smaller than the predetermined threshold.

For example, the controller 51 controls the electric actuator 49 so that the rotational-force adjustment structure 47 applies the second resistance to the rotation of the pulley assembly 45 relative to the movable member 43 when the second driving force is equal to or smaller than the predetermined threshold.

The controller 51 controls the electric actuator 49 so that the rotational-force adjustment structure 47 applies the fifth resistance to the rotation of the pulley assembly 45 relative to the movable member 43 during the shifting operation.

The controller 51 controls the electric actuator 49 so that the rotational-force adjustment structure 47 applies the sixth resistance to the rotation of the pulley assembly 45 relative to the movable member 43 during the non-shifting operation.

The controller 51 controls the electric actuator 49 so that the resistance of a first case is larger than the resistance of a second case.

In the first case, at least two conditions among the condition that the shifting operation is performed, the condition that the rotational force related information is high, and the condition that the rear sprocket with which the bicycle chain 9 engages is the small rear sprocket are satisfied.

In the second case, at least one condition among the condition that the shifting operation is performed, the condition that the rotational force related information is high, and the condition that the rear sprocket with which the bicycle chain 9 engages is the small rear sprocket is satisfied.

In a case when the number of rear sprockets of the rear sprocket assembly 28, which is mounted to the bicycle frame 11, is equal to or larger than three, the controller 51 controls the electric actuator 49 so that the resistance force is changed according to a size of the rear sprocket with which the bicycle chain 9 is engaged.

<Configuration of Controller>

Figure 4:
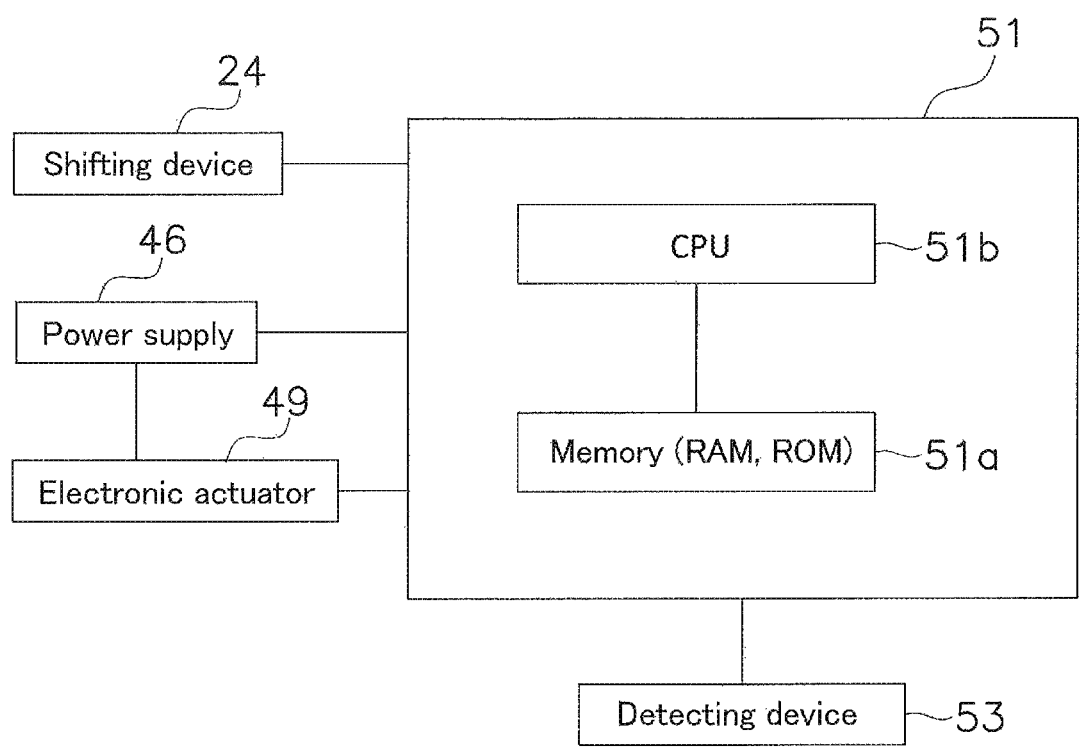
FIG. 4 is a functional block diagram for explaining a configuration of a controller according to the first embodiment of the present disclosure.

The controller 51 controls the electric actuator 49 by performing the control program based on the driving-force related information of the memory 51a. As shown in FIG. 4, the controller 51 includes a memory 51a and a CPU 51b (Central Processing Unit).

(Memory)

The memory 51a includes a control program for controlling the electric actuator 49. The memory 51a further includes the driving-force related information. The memory 51a further includes the predetermined threshold.

The memory 51a includes a ROM (Read Only Memory) and a RAM (Random Access Memory). The ROM stores the control program. The RAM temporarily stores data for performing the control program. The RAM can be provided as an external memory.

Figure 5:
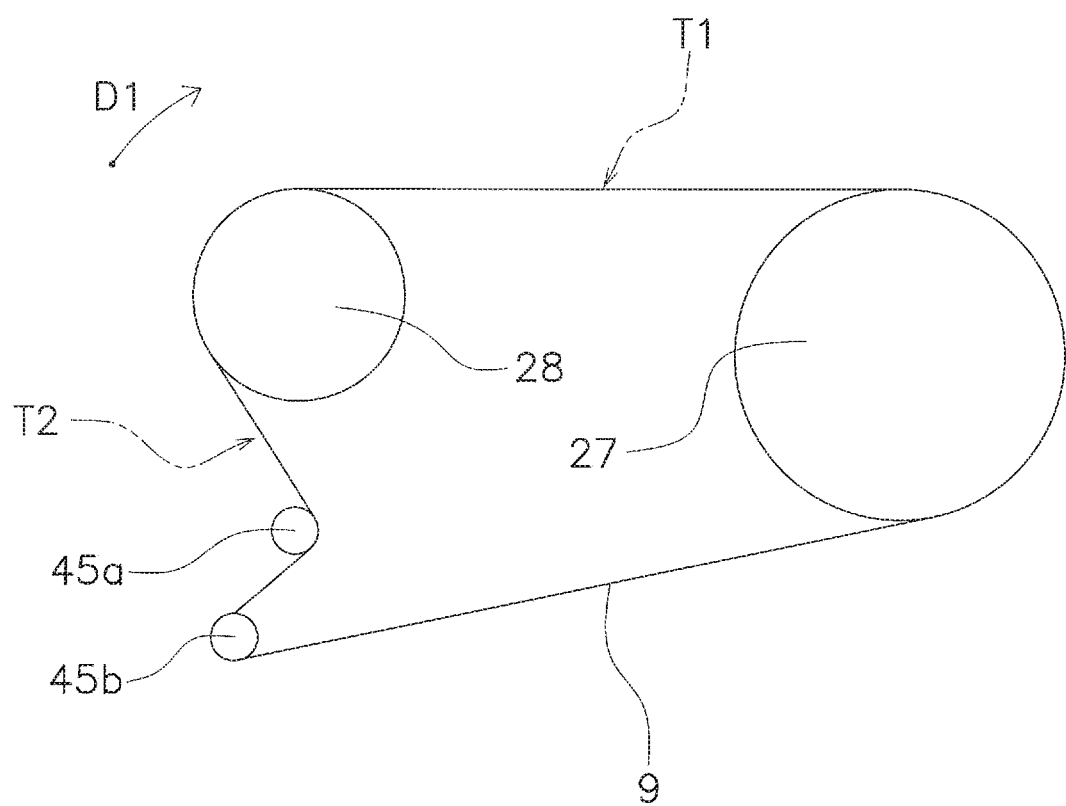
FIG. 5 is a conceptual diagram for explaining a chain tension according to the first embodiment of the present disclosure.

The driving-force related information is data for directly or indirectly estimating a first chain tension T1 (see FIG. 5). Data of a detecting device 53 can be directly or indirectly used as the driving-force related information. The first chain tension T1 is a tension generated on the bicycle chain 9 between the crank assembly 27 and the rear sprocket assembly 28.

The driving-force related information is detected by the detecting device 53. The detecting device 53 includes a bicycle power meter, strain gauge, and the like.

The driving-force related information includes at least one of a crank information, a pedal information, a rear sprocket information, and the like. Each of the crank information, the pedal information, and the rear sprocket information includes power data, strength data, force data, and the like.

The crank information is detected by the detecting device 53 attached to at least one crank arm of the pair of crank arms 34. The crank information is detected by the detecting device 53 attached to the crank axle. The pedal information is detected by the detecting device 53 attached to at least one pedal of a pair of pedals 34a. The rear sprocket information is detected by the detecting device 53 attached to the rear sprocket assembly 28.

(CPU)

The CPU 51b performs the control program of the memory 51a. The CPU 51b estimates the first chain tension T1 based on the driving-force related information. The CPU 51b controls the electric actuator 49 based on the driving-force related information.

For example, the CPU 51b calculates a driving force based on at least one of the crank information, the pedal information, and the rear sprocket information. The CPU 51b calculates the first chain tension T1 based on the driving force.

A relationship between the driving force and the driving-force related information (the crank information, the pedal information, and the rear sprocket information) is stored on the memory 51a. A relationship between the first chain tension T1 and the driving force is stored on the memory 51a.

<Control System of Controller>

Figure 6A:
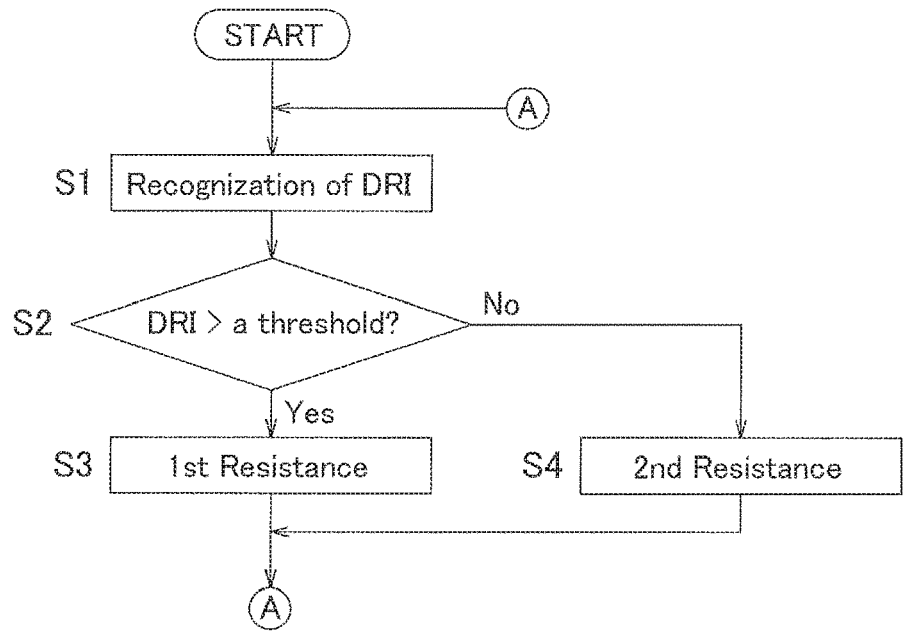
FIG. 6A is a flow chart for explaining a control system of the controller according to the first embodiment of the present disclosure.

As shown in FIG. 6A, the controller 51 recognizes the driving-force related information (S1). The driving-force related information is indicated by "DRI" in FIG. 6A.

The controller 51 determines whether the driving-force related information is the first driving force or the second driving force. The first driving force is defined in a range which is larger than the predetermined threshold. The second driving force is defined in a range which is equal to or smaller than the predetermined threshold.

Alternatively, the first driving force can be defined in a range which is equal to or larger than the predetermined threshold, and the second driving force can be defined in a range which is smaller than the predetermined threshold.

For example, the controller 51 determines whether the driving-force related information is larger than the predetermined threshold (S2). In a case when the driving-force related information is larger than the predetermined threshold (Yes in S2), the controller 51 controls the electric actuator 49 so that the rotational-force adjustment structure 47 applies the first resistance to the rotation of the chain guide plates 45c via the electric actuator 49 (S3).

In this case, the rotational-force adjustment structure 47 applies the first resistance to the rotation of the chain guide plates 45c in the first rotational direction R1. The first rotational direction R1 corresponds to a counterclockwise rotational direction.

Thereby, a second chain tension T2 (see FIG. 5), which generates on the chain between the rear sprocket assembly 28 and the first pulley 45a, increases. As a result, a chain roller(s) of the bicycle chain 9, which is disposed between the teeth of one rear sprocket, moves toward the first pulley 45a along the bicycle chain 9.

The increase of the second chain tension T2 prevents the chain roller(s) of the bicycle chain 9 from riding on the tooth of the rear sprocket assembly 28 because the second chain tension T2 resists the first tension T1 by which the bicycle chain 9 is pulled from the rear sprocket assembly 28 toward the crank assembly 27.

In other words, the bicycle chain 9 is arranged on the teeth of the rear sprocket assembly 28 from the downstream side to the upstream side along a driving rotational direction D1 (see FIG. 5) of the rear sprocket assembly 28

In this state, when the bicycle chain 9 moves from the one rear sprocket to another rear sprocket during the shifting operation, the chain roller(s) is suitably disposed between the teeth of the other rear sprocket.

In a case when the driving-force related information is equal to or smaller than the predetermined threshold (No in S2), the controller 51 controls the electric actuator 49 so that the rotational-force adjustment structure 47 applies the second resistance to the rotation of the chain guide plates 45c via the electric actuator 49 (S4). The second resistance is smaller than the first resistance.

In this case, the rotational-force adjustment structure 47 applies the second resistance to the rotation of the chain guide plates 45c in the second rotational direction R2. The second rotational direction R2 corresponds to a clockwise rotational direction.

Thereby, the second chain tension T2 decreases. As a result, the chain roller(s) of the bicycle chain 9, which is disposed between the teeth of one rear sprocket, moves in a direction away from the first pulley 45a (the guide pulley) along the bicycle chain 9.

In a case when the rotational-force adjustment structure 47 applies the first resistance to the rotation of the chain guide plates 45c in a state where the chain tension is low, the chain roller(s) of the bicycle chain 9 may ride on the rear sprocket tooth of the upstream side in the clockwise rotational direction.

Thereby, in a case when the chain tension is low, the second resistance is applied to the rotation of the chain guide plates 45c. Thus, the chain roller(s) of the bicycle chain 9 can be disposed between the teeth of the rear sprocket.

A large shock may be generated when a shift operation is performed in a state where clearance, which is provided between the rear sprocket tooth and the chain roller(s), is large. But the clearance is appropriately maintained by applying the second resistance. In other words, the chain roller(s) is arranged at a proper interval from the tooth of the upstream side in the driving rotational direction D1 (see FIG. 5) of the rear sprocket assembly 28.

In this state, when the bicycle chain 9 moves from the one rear sprocket to another rear sprocket during the shifting operation, the chain roller(s) is suitably disposed between the teeth of the other rear sprocket. When the above steps 3 and 4 (S3 and S4) finish, the above step 1 (S1) is performed.

Figure 6B:
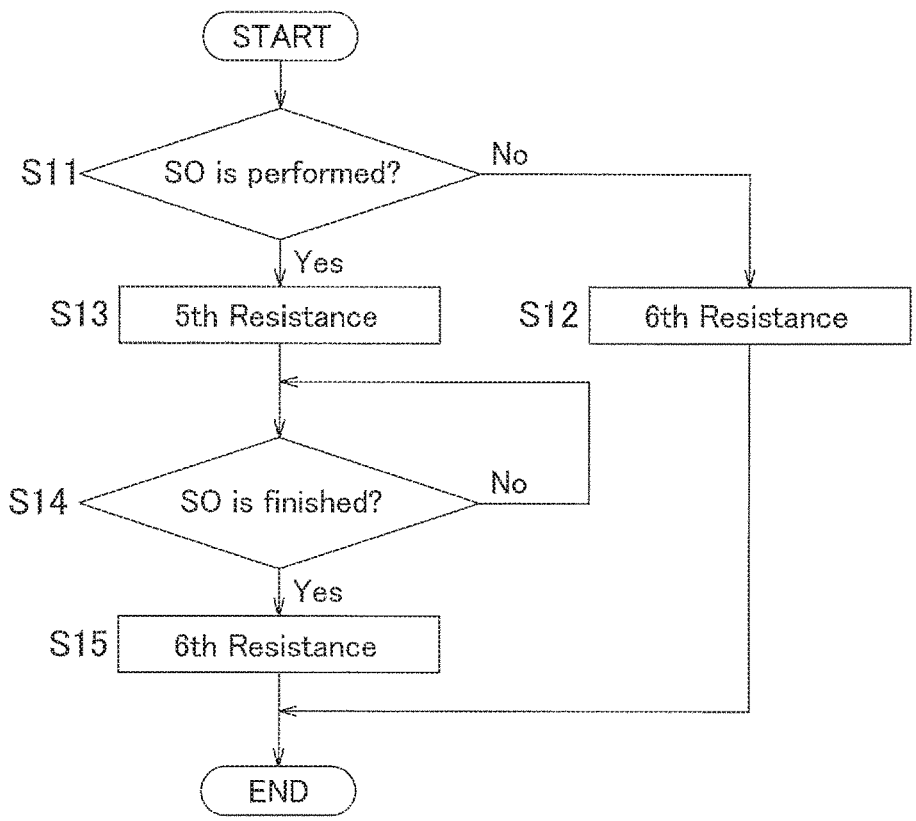
FIG. 6B is a flow chart for explaining the control system of the controller according to the first embodiment of the present disclosure.

As shown in FIG. 6B, the control system of the controller 51 can be configured as follows. The controller 51 determines whether the shifting operation is performed (S11). "The shifting operation" is indicated by "SO" in FIG. 6B.

In a case when the shifting operation is not performed (No in S11), the controller 51 controls the electric actuator 49 so that the rotational-force adjustment structure 47 applies the sixth resistance to the rotation of the chain guide plates 45c via the electric actuator 49 (S12).

In a case when the shifting operation is performed (Yes in S11), the controller 51 controls the electric actuator 49 so that the rotational-force adjustment structure 47 applies the fifth resistance to the rotation of the chain guide plates 45c via the electric actuator 49 (S13).

The controller 51 determines whether the bicycle chain 9 is disposed on another rear sprocket (S14). In a case when the bicycle chain 9 is disposed on another rear sprocket (Yes in S14), the controller 51 controls the electric actuator 49 so that the rotational-force adjustment structure 47 applies the sixth resistance to the rotation of the chain guide plates 45c (S15). In a case when the bicycle chain 9 is not disposed on another rear sprocket (No in S14), the controller 51 repeats the process of step 14 (S14) until the bicycle chain 9 is disposed on another rear sprocket.

Figure 6C:
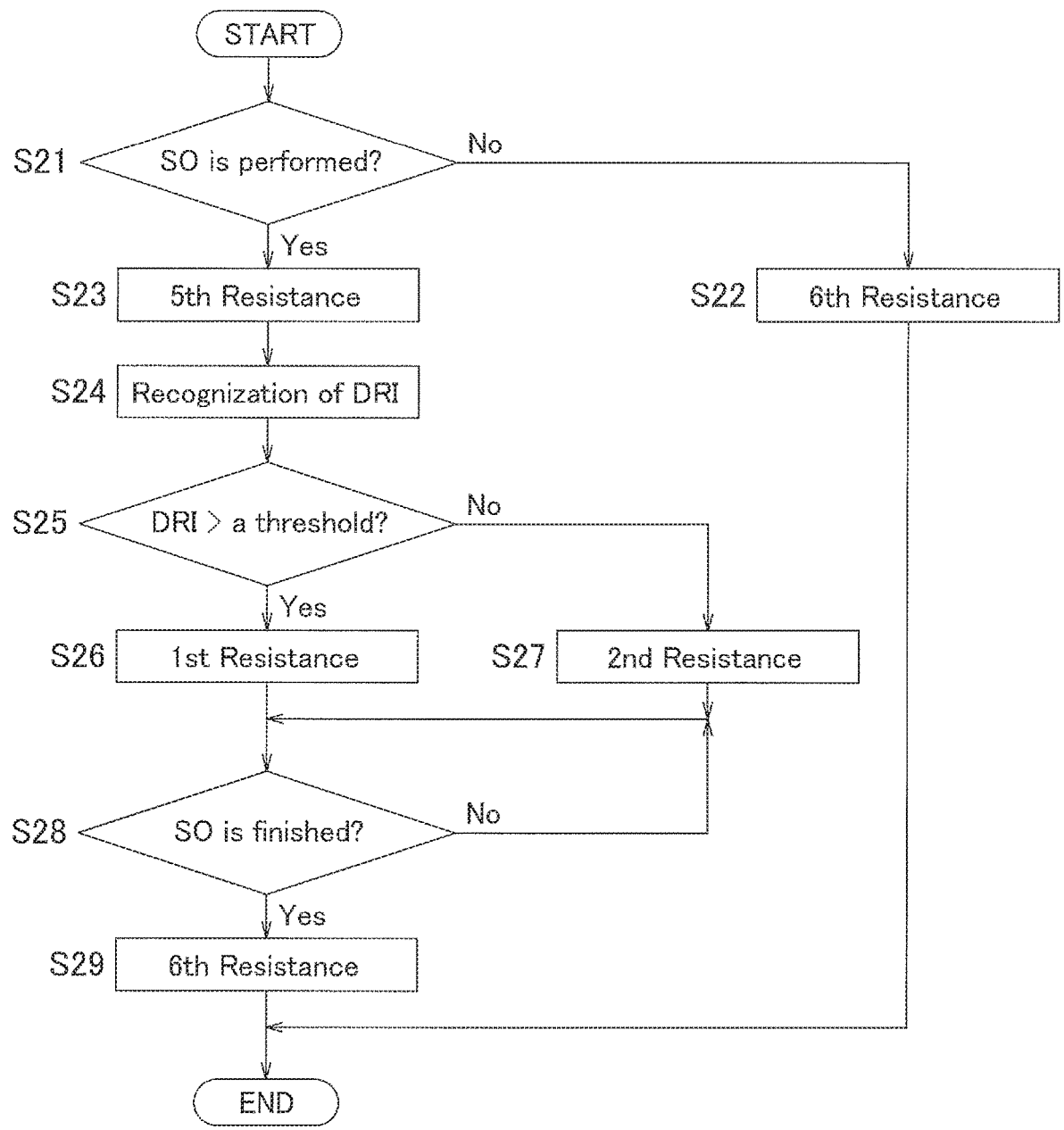
FIG. 6C is a flow chart for explaining the control system of the controller according to the first embodiment of the present disclosure.

As shown in FIG. 6C, the control system of the controller 51 can be configured as follows. As shown in FIG. 6C, the controller 51 determines whether the shifting operation is performed (S21). "The shifting operation" is indicated by "SO" in FIG. 6C.

In a case when the shifting operation is not performed (No in S21), the controller 51 controls the electric actuator 49 so that the rotational-force adjustment structure 47 applies the sixth resistance to the rotation of the chain guide plates 45c via the electric actuator 49 (S22).

In a case when the shifting operation is performed (Yes in S21), the controller 51 controls the electric actuator 49 so that the rotational-force adjustment structure 47 applies the fifth resistance to the rotation of the chain guide plates 45c via the electric actuator 49 (S23). The controller 51 recognizes the driving-force related information (S24). The driving-force related information is indicated by "DRI" in FIG. 6C.

The controller 51 determines whether the driving-force related information is the first driving force or the second driving force. The first driving force is defined in a range which is larger than the predetermined threshold. The second driving force is defined in a range which is equal to or smaller than the predetermined threshold.

Alternatively, the first driving force can be defined in a range which is equal to or larger than the predetermined threshold, and the second driving force can be defined in a range which is smaller than the predetermined threshold.

For example, the controller 51 determines whether the driving-force related information is larger than the predetermined threshold (S25). In a case when the driving-force related information is larger than the predetermined threshold (Yes in S25), the controller 51 controls the electric actuator 49 so that the rotational-force adjustment structure 47 applies the first resistance to the rotation of the chain guide plates 45c via the electric actuator 49 (S26).

In this case, the rotational-force adjustment structure 47 applies the first resistance to the rotation of the chain guide plates 45c in the first rotational direction R1. The first rotational direction R1 corresponds to a counterclockwise rotational direction.

Thereby, a second chain tension T2 (see FIG. 5), which generates on the chain between the rear sprocket assembly 28 and the first pulley 45a, increases. As a result, the chain roller(s) of the bicycle chain 9, which is disposed between the teeth of one rear sprocket, moves toward the first pulley 45a along the bicycle chain 9.

The increase of the second chain tension T2 prevents the chain roller(s) of the bicycle chain 9 from riding on the tooth of the rear sprocket assembly 28, because the second chain tension T2 resists the first tension T1 by which the bicycle chain 9 is pulled from the rear sprocket assembly 28 toward the crank assembly 27.

In other words, the bicycle chain 9 is arranged on the teeth of the rear sprocket assembly 28 from the downstream side to the upstream side along a driving rotational direction D1 (see FIG. 5) of the rear sprocket assembly 28

In this state, when the bicycle chain 9 moves from one rear sprocket to another rear sprocket during the shifting operation, the chain roller(s) is suitably disposed between the teeth of the other rear sprocket.

In a case when the driving-force related information is equal to or smaller than the predetermined threshold (No in S25), the controller 51 controls the electric actuator 49 so that the rotational-force adjustment structure 47 applies the second resistance to the rotation of the chain guide plates 45c via the electric actuator 49 (S27). The second resistance is smaller than the first resistance.

In this case, the rotational-force adjustment structure 47 applies the second resistance to the rotation of the chain guide plates 45c in the second rotational direction R2. The second rotational direction R2 corresponds to a clockwise rotational direction.

Thereby, the second chain tension T2 decreases. As a result, the chain roller(s) of the bicycle chain 9, which is disposed between the teeth of one rear sprocket, moves in a direction away from the first pulley 45a (the guide pulley) along the bicycle chain 9.

In a case when the rotational-force adjustment structure 47 applies the first resistance to the rotation of the chain guide plates 45c in a state where the chain tension is low, the chain roller(s) of the bicycle chain 9 may ride on the rear sprocket tooth of the upstream side in the clockwise rotational direction.

Thereby, in a case when the chain tension is low, the second resistance is applied to the rotation of the chain guide plates 45c. Thus, the chain roller(s) of the bicycle chain 9 can be disposed between the teeth of the rear sprocket.

A large shock may be generated when a shift operation is performed in a state where clearance, which is provided between the rear sprocket tooth and the chain roller(s), is large. But the clearance is appropriately maintained by applying the second resistance. In other words, the chain roller(s) is arranged at a proper interval from the tooth of the upstream side in the driving rotational direction D1 (see FIG. 5) of the rear sprocket assembly 28.

In this state, when the bicycle chain 9 moves from one rear sprocket to another rear sprocket during the shifting operation, the chain roller(s) is suitably disposed between the teeth of the other rear sprocket.

The controller 51 determines whether the bicycle chain 9 is disposed on another rear sprocket (S28). In a case when the bicycle chain 9 is disposed on another rear sprocket (Yes in S28), the controller 51 controls the electric actuator 49 so that the rotational-force adjustment structure 47 applies the sixth resistance to the rotation of the chain guide plates 45c (S29). In a case when the bicycle chain 9 is not disposed on another rear sprocket (No in S28), the controller 51 repeats the process of step 28 (S28) until the bicycle chain 9 is disposed on another rear sprocket.

Figure 6D:
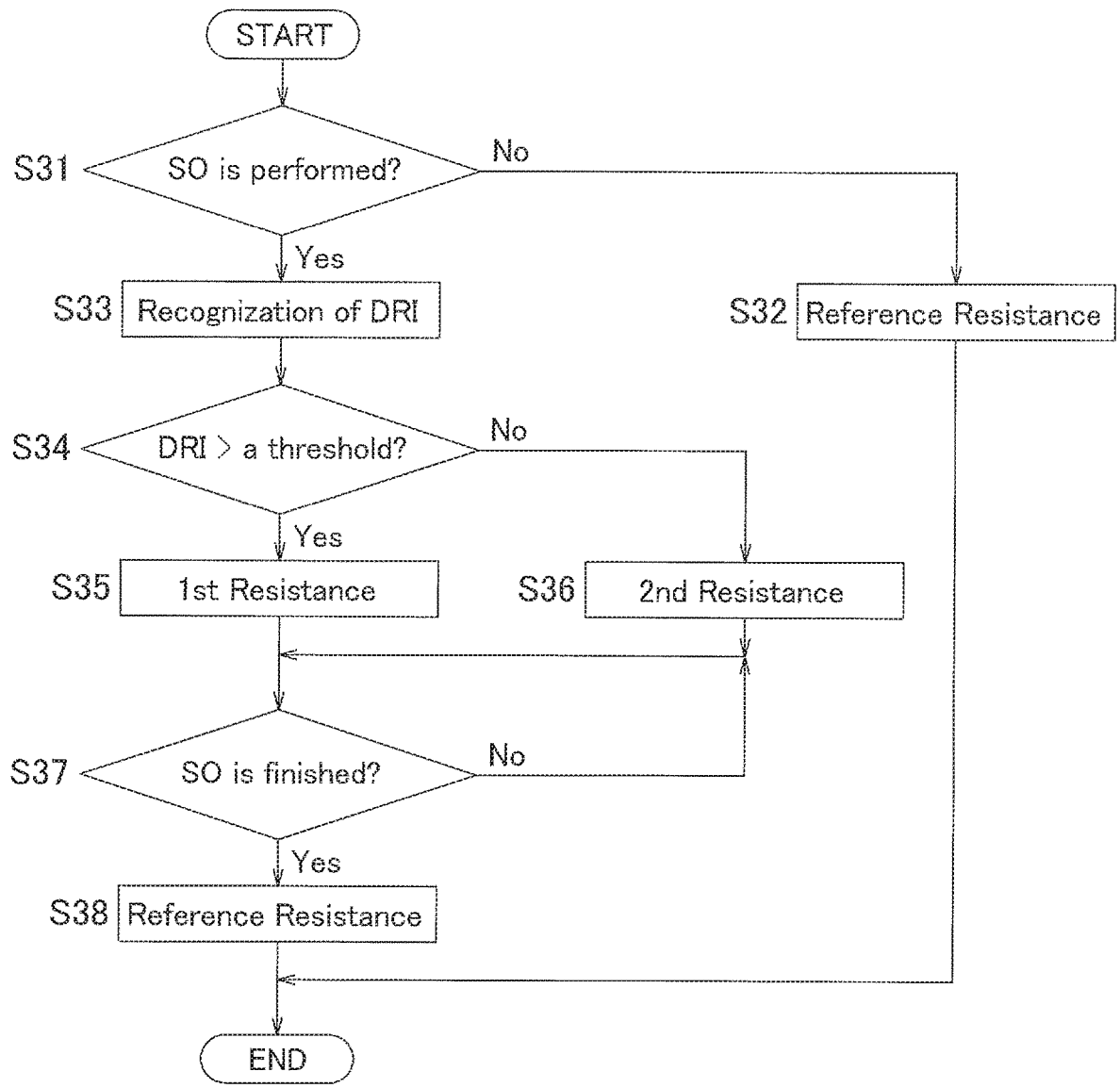
FIG. 6D is a flow chart for explaining the control system of the controller according to the first embodiment of the present disclosure.

The control system of the controller 51 can be configured as follows. As shown in FIG. 6D, the controller 51 determines whether the shifting operation is performed (S31). In a case when the shifting operation is not performed (No in S31), the controller 51 controls the electric actuator 49 so that the rotational-force adjustment structure 47 applies the reference resistance to the rotation of the chain guide plates 45c via the electric actuator 49 (S32).

In a case when the shifting operation is performed (Yes in S31), the controller 51 recognizes the driving-force related information (S33). The controller 51 determines whether the driving-force related information is the first driving force or the second driving force. The first driving force is defined in a range which is larger than a first predetermined threshold. The second driving force is defined in a range which is equal to or smaller than a second predetermined threshold.

For example, the controller 51 determines whether the driving-force related information is larger than the predetermined threshold (S34). In a case when the driving-force related information is larger than the predetermined threshold (Yes in S34), the controller 51 controls the electric actuator 49 so that the rotational-force adjustment structure 47 applies the first resistance to the rotation of the chain guide plates 45c via the electric actuator 49 (S35). In this case, the rotational-force adjustment structure 47 applies the first resistance to the rotation of the chain guide plates 45c in the first rotational direction R1.

In a case when the driving-force related information is equal to or smaller than the predetermined threshold (No in S34), the controller 51 controls the electric actuator 49 so that the rotational-force adjustment structure 47 applies the second resistance to the rotation of the chain guide plates 45c via the electric actuator 49 (S36). In this case, the rotational-force adjustment structure 47 applies the second resistance to the rotation of the chain guide plates 45c in the second rotational direction R2.

The controller 51 determines whether the bicycle chain 9 is disposed on another rear sprocket (S37). In a case when the bicycle chain 9 is disposed on another rear sprocket (Yes in S37), the controller 51 controls the electric actuator 49 so that the rotational-force adjustment structure 47 applies the reference resistance to the rotation of the chain guide plates 45c (S38).

In a case when the bicycle chain 9 is not disposed on another rear sprocket (No in S37), the controller 51 repeats the process of step 37 (S37) until the bicycle chain 9 is disposed on another rear sprocket.

<Variation of the First Embodiment>

(A1) A variation of the first embodiment can be described as follows. The controller 51 can control the electric actuator 49 with a third threshold and a fourth threshold. The fourth threshold is equal to the third threshold. Each of the third and fourth thresholds is defined with a predetermined value and is stored on the memory 51a.

In a case when the driving-force related information is larger than the third threshold (Yes in S35), the controller 51 controls the electric actuator 49 so that the rotational-force adjustment structure 47 applies the first resistance to the rotation of the chain guide plates 45c via the electric actuator 49 (S36).

In a case when the driving-force related information is equal to or smaller than the fourth threshold (No in S35), the controller 51 controls the electric actuator 49 so that the rotational-force adjustment structure 47 applies the second resistance to the rotation of the chain guide plates 45c via the electric actuator 49 (S37).

(A2) As a variation of the above embodiment (A), the fourth threshold can be smaller than the third threshold. The driving-force related information is defined in any one of the first to third states as follows.

The first state is a state where the driving-force related information is larger than the third threshold. The second state is a state where the driving-force related information is a value in a range which is equal to or smaller than the third threshold and larger than the fourth threshold. The third state is a state where the driving-force related information is equal to or smaller than the fourth threshold.

In a case when the driving-force related information changes from the first state to the second state, the controller 51 controls the electric actuator 49 so that the rotational-force adjustment structure 47 applies the first resistance to the rotation of the chain guide plates 45c via the electric actuator 49.

In a case when the driving-force related information changes from the third state to the second state, the controller 51 controls the electric actuator 49 so that the rotational-force adjustment structure 47 applies the second resistance to the rotation of the chain guide plates 45c via the electric actuator 49.

Second Embodiment

Figure 7:
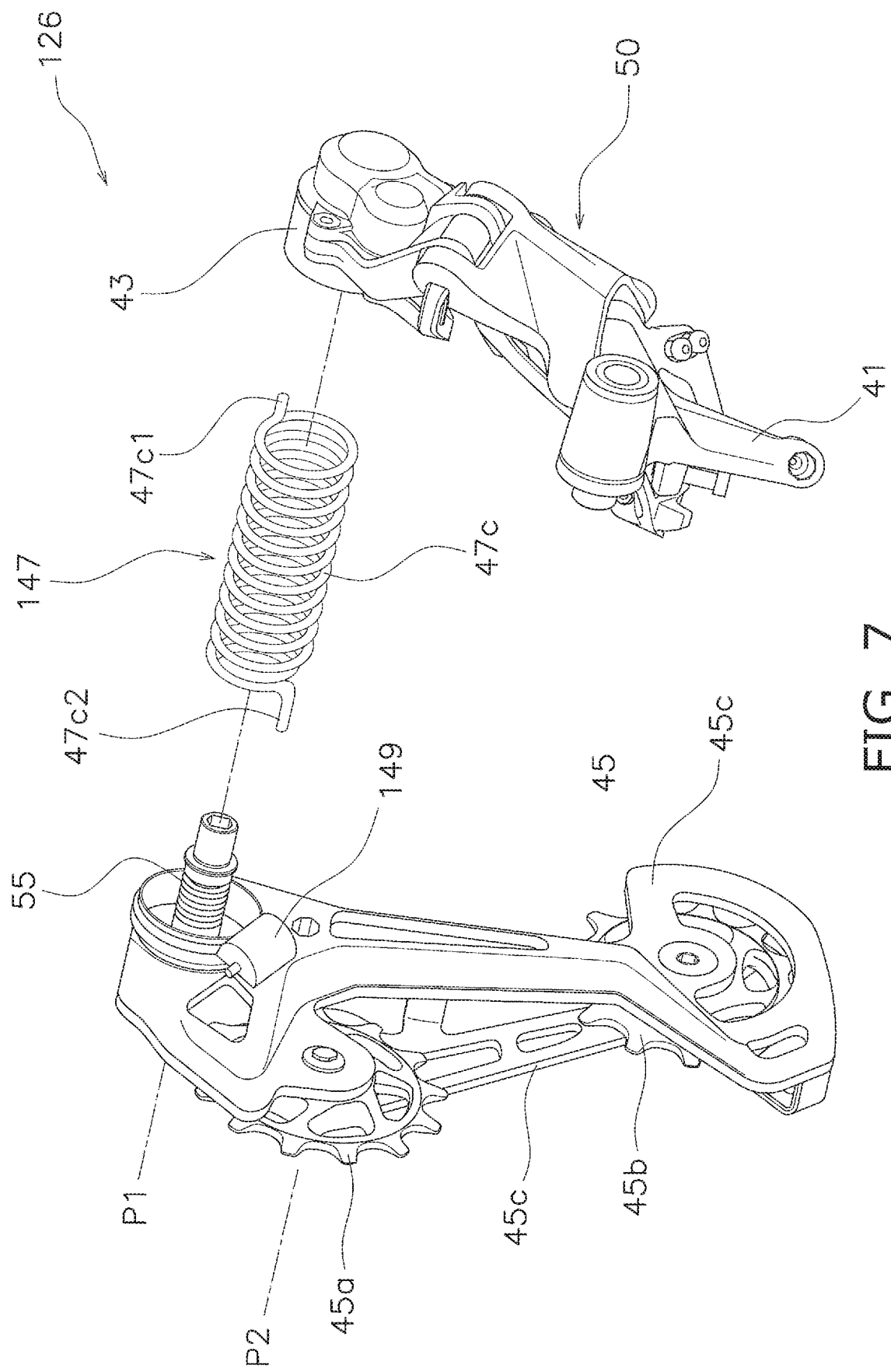
FIG. 7 is a disassembled oblique view of the bicycle derailleur according to a second embodiment of the present disclosure.

As shown in FIG. 7, the configuration of the second embodiment is substantially the same as the first embodiment. In the second embodiment, specific explanations of elements that are substantially the same as in the first embodiment are omitted. The description of the first embodiment is applied to the second embodiment with regard to any elements omitted in the description below.

In this embodiment, the bicycle derailleur 126 is configured as follows. As shown in FIG. 7, the first pulley 45a is rotatable about a second pivot axis P2 that is offset from the first pivot axis P1.

The first pulley 45a can be rotatable about the first pivot axis P1. In this case, the first pulley 45a is mounted to the chain guide plates 45c so that the second pivot axis P2 is coaxial with the first pivot axis P1.

The rotational-force adjustment structure 147 includes a biasing member 47c. For example, the biasing member 47c is a coil spring. The biasing member 47c biases the pulley assembly 45 relative to the movable member 43 in the clockwise rotational direction. The pulley assembly 45 includes a pair of the chain guide plates 45c and at least one pulley.

The rotational-force adjustment structure 147 is disposed between the movable member 43 and the pulley assembly 45. The biasing member 47c is disposed around a connecting shaft 55 for connecting the pulley assembly 45 to the movable member 43. Specifically, the biasing member 47c is disposed around the connecting shaft 55 via a bush member. The connecting shaft 55 includes the first pivot axis P1.

The biasing member 47c has a first end 47c1 and a second end 47c2. The first end 47c1 is operatively coupled to the movable member 43 and disposed closer to the movable member 43 than the second end 47c2. The second end 47c2 is operatively coupled to the pulley assembly 45 and disposed closer to the pulley assembly 45 than the first end 47c1.

The electric actuator 149 is configured to move one of the first end 47c1 and the second end 47c2 relative to the other of the first end 47c1 and the second end 47c2 so that resistance is applied to the rotation of the pulley assembly 45 relative to the movable member 43. The electric actuator 149 can include an actuator body and a reduction structure.

In this embodiment, the first end 47c1 directly or indirectly engages with the movable member 43. The second end 47c2 directly or indirectly engages with the pulley assembly 45. The second end 47c2 can engage with the pulley assembly 45 via the electric actuator 149.

The first end 47c1 can engage with the movable member 43 via the electric actuator 149. In this case, the second end 47c2 directly or indirectly engages with the pulley assembly 45.

The electric actuator 149 is disposed on the movable member 43 or the pulley assembly 45. The electric actuator 149 can be disposed on the base member 4 or the linkage structure 50. The electric actuator 149 includes a solenoid. A shaft portion of the solenoid abuts the second end 47c2. The shaft portion of the solenoid can abut a mounting portion of the second end 47c2. In this state, the shaft portion moves in advance and retreat based on operation command from the controller 51.

In other words, the controller 51 controls the solenoid so that the biasing member 47c tightens or loosens in a circumferential direction with respect to the first pivot axis P1. The biasing member 47c deforms by operation of the solenoid. The resistance, which is applied to the rotation of the chain guide plates 45c relative to the movable member 43, is adjusted according to the tightening extent of the biasing member 47c.

In a case when the bicycle derailleur 126 is configured as described above, the controller 51 controls the electric actuator 149 as described in the first embodiment (see FIGS. 6A, 6B, 6C and 6D).

<Variation of the Second Embodiment>

Figure 8:
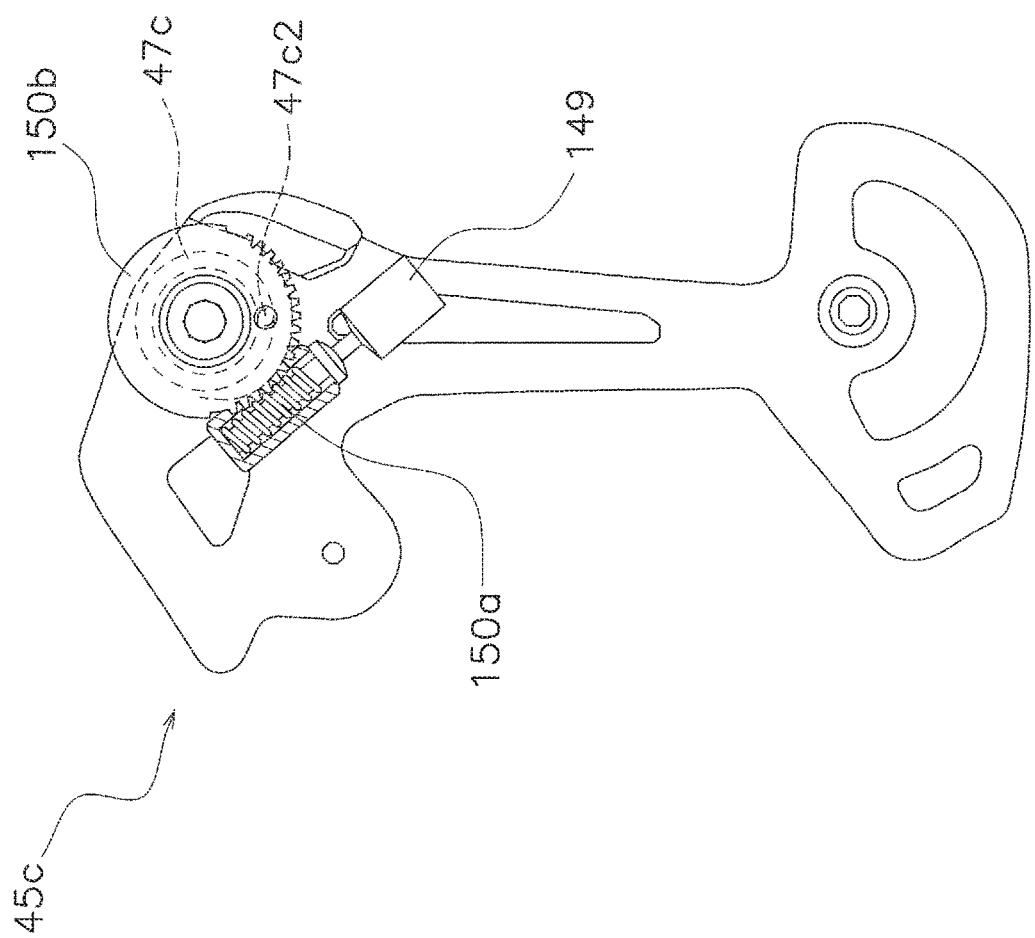
FIG. 8 is a front view for explaining a power transmission structure of the bicycle derailleur according to the second embodiment of the present disclosure.

(B1) As a variation of the second embodiment, as shown in FIG. 8, the electric actuator 149 can include a motor. A power of the motor is transmitted from the motor to the biasing member 47c via a power transmission structure 150.

The power transmission structure 150 is provided between the motor 149 and the biasing member 47c. The power transmission structure 150 includes a screw member 150a and a pivot member 150b. The screw member 150a is connected to the motor 149. A reduction mechanism can be disposed between the screw member 150a and the motor 149. The pivot member 150b engages with the screw member 150a. For example, a plurality of teeth of the pivot member 150b engages with a helical groove of the screw member 150a. The pivot member 150b pivotably rotates when the screw member 150a rotates by the motor 149.

The biasing member 47c deforms by operation of the motor 149. For example, the second end 47c2 of the biasing member 47c engages with a hole portion of the pivot member 150b. The biasing member 47c tightens or loosens in the circumferential direction with respect to the first pivot axis P1 when the pivot member 150b rotates.

Third Embodiment

Figure 9:
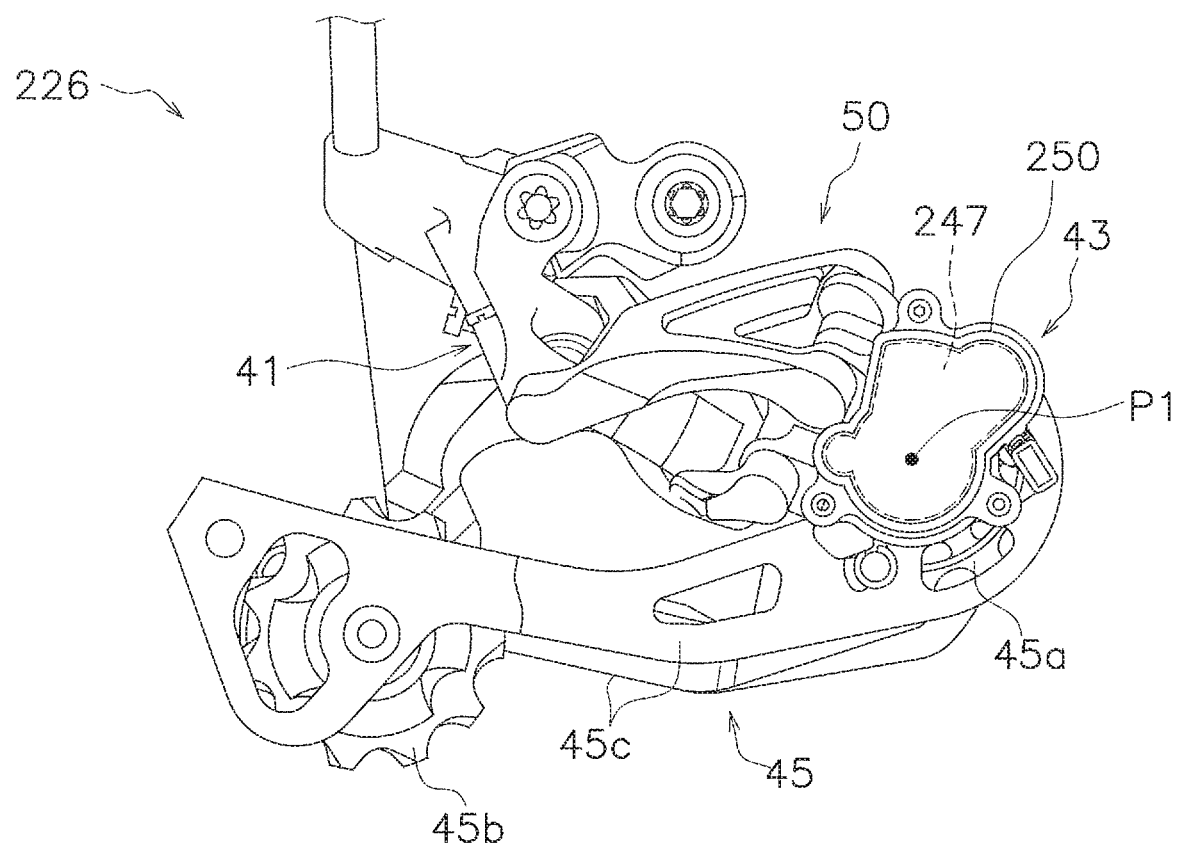
FIG. 9 is a front view from outside of a bicycle derailleur according to a third embodiment of the present disclosure.

As shown in FIG. 9, the configuration of the third embodiment is substantially the same as the first embodiment. In the third embodiment, specific explanations of elements that are substantially the same as in the first embodiment are omitted. The description of the first embodiment is applied to the third embodiment with regard to any elements omitted in the description below.

Figure 10:
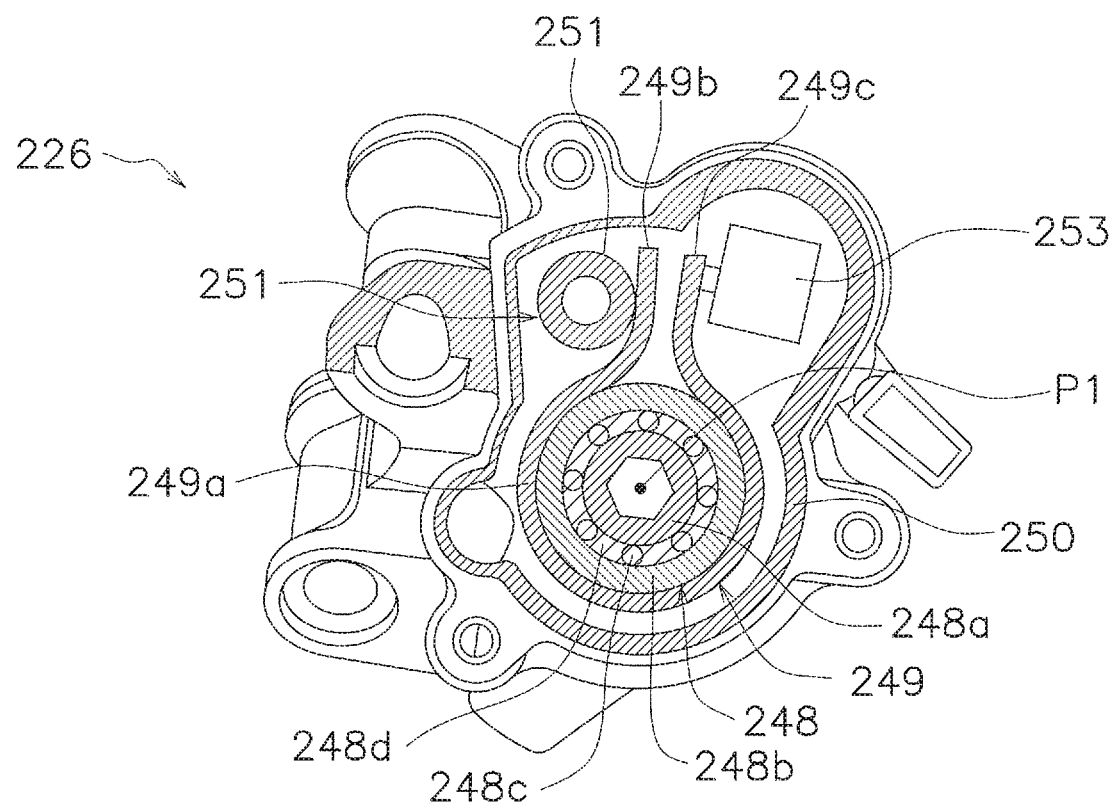
FIG. 10 is a partial cross-sectional view of the bicycle derailleur according to the third embodiment of the present disclosure.

In this embodiment, the bicycle derailleur 226 is configured as follows. As shown in FIGS. 9 and 10, the rotational-force adjustment structure 247 includes a one-way clutch mechanism 248 and a resistance applying member 249.

The one-way clutch mechanism 248 is disposed in a housing 250 of the movable member. In this embodiment, the one-way clutch mechanism 248 is a roller clutch.

The one-way clutch mechanism 248 includes a first member 248a and a second member 248b facing the first member 248a. The one-way clutch mechanism 248 further includes a plurality of rollers 248c and a roller retainer 248d.

The first member 248a is a connecting shaft for connecting the chain guide plates 45c to the movable member 43. The first member 248a includes the first pivot axis P1. The first member 248a can be integrally formed with a rotational axle of the pulley assembly 45. The second member 248b is disposed outward of the first member 248a in a radial direction with respect to the first pivot axis P1.

The plurality of rollers 248c are disposed between the first member 248a and the second member 248b in the radial direction with respect to the first pivot axis P1. The roller retainer 248d positions the plurality of rollers 248c in a circumferential direction with respect to the first pivot axis P1. The roller retainer 248d is configured to permit and inhibit relative movement between the first member 248a and the second member 248b.

In the above configuration, the one-way clutch mechanism 248 is configured to permit relative movement between the first member 248a and the second member 248b in a first direction. The one-way clutch mechanism 248 is configured to inhibit the relative movement between the first member 248a and the second member 248b in a second direction that is opposite to the first direction.

In this case, the pulley assembly 45 pivots relative to the movable member 43 in the clockwise rotational direction via the one-way clutch mechanism 248, when the bicycle chain 9 moves from a larger sprocket toward a smaller sprocket which is smaller than the larger sprocket.

The one-way clutch mechanism 248 inhibits the relative movement between the first member 248a and the second member 248b, when the chain guide plates 45c pivots in the clockwise rotational direction. The clockwise rotational direction corresponds to the second direction.

The resistance applying member 249 is configured to indirectly or directly apply the resistance to one of the first member 248a and the second member 248b. The resistance applying member 249 includes a friction applying portion 249a and two end portions 249b, 249c.

The friction applying portion 249a is disposed along an outer peripheral surface of the second member 248b. The two end portions 249b, 249c extend radially outwardly from the friction applying portion 249a. The two end portions 249b, 249c are disposed between a support portion 251 and an output portion of the electric actuator 253. The electric actuator 253 can include an actuator body and a reduction structure.

The electric actuator 253 is configured to operate the resistance applying member 249 so that resistance is applied to the rotation of the pulley assembly 45 relative to the movable member 43.

Specifically, the electric actuator 253 operates the resistance applying member 249 so that resistance is applied to the rotation of the pulley assembly 45 relative to the movable member 43 during the shifting operation. The electric actuator 253 operates the resistance applying member 249 so that the resistance is not applied to rotation of the pulley assembly 45 relative to the movable member 43 during the non-shifting operation.

The controller 51 actuates the electric actuator 253 during the shifting operation as follows. For example, the electric actuator 253 includes a solenoid. A shaft portion of the solenoid abuts the end portion 249c. In this state, the shaft portion moves in advance and retreat based on an operation command from the controller 51.

In other words, the controller 51 controls the solenoid so that an inner diameter of the friction applying portion 249a changes. The friction, which is applied to the second member 248b, is adjusted according to the tightening extent of the resistance applying member 249.

Thus, the resistance applying member 249 applies the friction to the rotational-force adjustment structure 247, for example, the one-way clutch mechanism 248. The rotational-force adjustment structure 47 applies resistance to the rotation of the first pulley 45a (the guide pulley) relative to the movable member 43 via the rotational-force adjustment structure 247.

In a case when the bicycle derailleur 226 is configured as described above, the controller 51 controls the electric actuator 253 as described in the first embodiment (see FIGS. 6A, 6B, 6C and 6D).

The friction is adjusted by a fastening state of the resistance applying member 249. Thereby, each of the first resistance, the third resistance, and the fifth resistance can be the same as each other. Each of the first resistance, the third resistance, and the fifth resistance can be different from each other. The adjustment of each of the first resistance, the third resistance, and the fifth resistance can be changed according to the fastening state of the resistance applying member 249.

The adjustment of each of the second resistance, the fourth resistance, and the sixth resistance can be changed according to the tightening state of the resistance applying member 249 as well as the first resistance, the third resistance, and the fifth resistance.

Fourth Embodiment

The configuration of the fourth embodiment is substantially the same as the above embodiments. In the fourth embodiment, specific explanations of elements that are substantially the same as in the above embodiments are omitted. The descriptions of the above embodiments are applied to the fourth embodiment with regard to any elements omitted in the description below.

Figure 11:
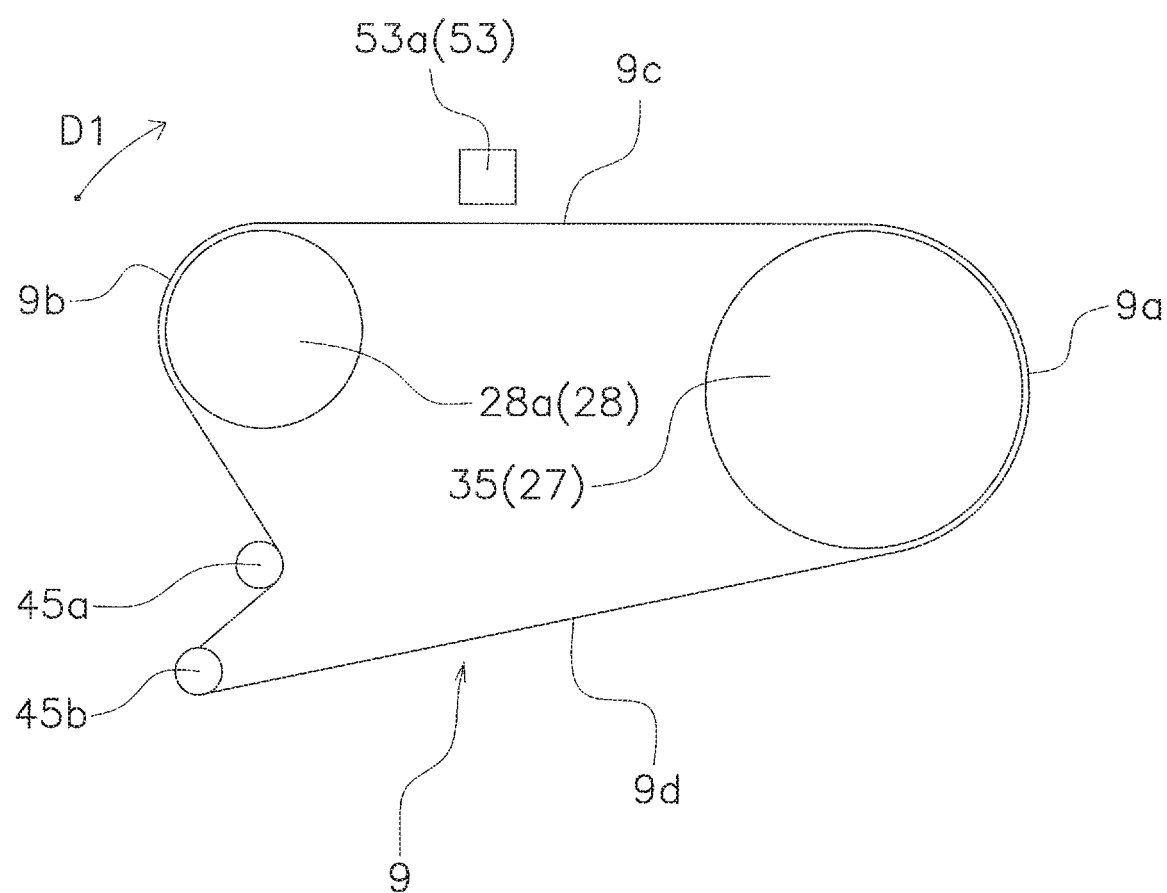
FIG. 11 is a conceptual diagram for explaining a bicycle drive train according to a fourth embodiment of the present disclosure.

In the above embodiments, the controller 51 is configured to control the electric actuator 49, 149, 253 based on the driving-force related information of the detecting device 53. For example, as shown in FIG. 11, the detecting device 53 includes a tension sensor 53a.

In this case, the bicycle 1 includes a bicycle drive train 3. The bicycle drive train 3 includes the bicycle chain 9 and the tension sensor 53a. The bicycle drive train 3 can include the driving portion 25, for example, the crank assembly 27, and the rear sprocket assembly 28.

The bicycle chain 9 is configured to engage with the front sprocket 35 and the rear sprocket 28a in a chain-equipped state.

The bicycle chain 9 has a front curvature portion 9a, a rear curvature portion 9b, an upper linear portion 9c and a lower linear portion 9d in the chain-equipped state.

The bicycle chain 9 engages with the front sprocket 35 at the front curvature portion 9a. The bicycle chain 9 engages with the rear sprocket 28a at the rear curvature portion 9b in the chain-equipped state. The upper linear portion 9c and the lower linear portion 9d extend between the front curvature portion 9a and the rear curvature portion 9b in the chain-equipped state. The upper linear portion 9c is disposed above the lower linear portion 9d in the chain-equipped state.

The tension sensor 53a is configured to detect a tension of the upper linear portion 9c of the bicycle chain 9 in the chain-equipped state.

The tension sensor 53a is mounted to the bicycle frame 11. For example, the tension sensor 53a is mounted to the bicycle frame 11 so as to face the upper linear portion 9c of the bicycle chain 9 in the chain-equipped state.

The tension sensor 53a outputs the driving-force related information to the controller 51. In this case, the driving-force related information includes a tension information corresponding to the tension of the upper linear portion 9c of the bicycle chain 9.

In a case when the bicycle derailleur 26 is configured as described above, the controller 51 controls the electric actuator 49 as described in the first embodiment (see FIGS. 6A, 6B, 6C and 6D).

The configuration of the fourth embodiment is described as follows.

A bicycle drive train comprising:
the bicycle derailleur including the base member configured to be attached to the bicycle frame, the movable member configured to move relative to the base member, the pulley assembly rotatably coupled to the movable member about the first pivot axis, the rotational-force adjustment structure at least partly disposed between the movable member and the pulley assembly so as to apply resistance to rotation of the pulley assembly relative to the movable member, the electric actuator configured to operate the rotational-force adjustment structure, and the controller configured to control the electric actuator based on a driving-force related information;
the bicycle chain configured to engage with a front sprocket and a rear sprocket in a chain-equipped state where the bicycle chain engages with the front sprocket and the rear sprocket, the bicycle chain having a front curvature portion, a rear curvature portion, an upper linear portion and a lower linear portion in the chain-equipped state, the bicycle chain engaging with the front sprocket at the front curvature portion and with the rear sprocket at the rear curvature portion in the chain-equipped state, the upper linear portion and the lower linear portion extending between the front curvature portion and the rear curvature portion in the chain-equipped state, the upper linear portion being disposed above the lower linear portion in the chain-equipped state; and
a tension sensor configured to detect a tension of the upper linear portion of the bicycle chain in the chain-equipped state.

Fifth Embodiment

As shown in FIG. 12, the configuration of the fifth embodiment is substantially the same as the above embodiments. In the fifth embodiment, specific explanations of elements that are substantially the same as in the above embodiments are omitted. The descriptions of the above embodiments are applied to the fifth embodiment with regard to any elements omitted in the description below.

In this embodiment, the bicycle derailleur 26, 126, 226 is configured as follows. The resistance includes a third resistance and a fourth resistance. The third resistance is larger than the fourth resistance.

The controller 51 controls the electric actuator 49, 149, 253 so that the rotational-force adjustment structure 47, 147, 247 applies the third resistance to the rotation of the pulley assembly 45 relative to the movable member 43 when the bicycle chain 9 engages with a smaller rear sprocket. The third resistance corresponds to the larger resistance.

Specifically, the controller 51 controls the electric actuator 49, 149, 253 so that the rotational-force adjustment structure 47, 147, 247 applies the third resistance to the rotation of the pulley assembly 45 relative to the movable member 43 when the bicycle chain 9 moves from the smaller rear sprocket to a larger rear sprocket.

The controller 51 controls the electric actuator 49, 149, 253 so that the rotational-force adjustment structure 47, 147, 247 applies the fourth resistance to the rotation of the pulley assembly 45 relative to the movable member 43 when the bicycle chain 9 engages with a larger rear sprocket. The fourth resistance corresponds to the smaller resistance.

Specifically, the controller 51 controls the electric actuator 49, 149, 253 so that the rotational-force adjustment structure 47, 147, 247 applies the fourth resistance to the rotation of the pulley assembly 45 relative to the movable member 43 when the bicycle chain 9 moves from the larger rear sprocket to the smaller rear sprocket.

<Control System of Controller>

Figure 12A:
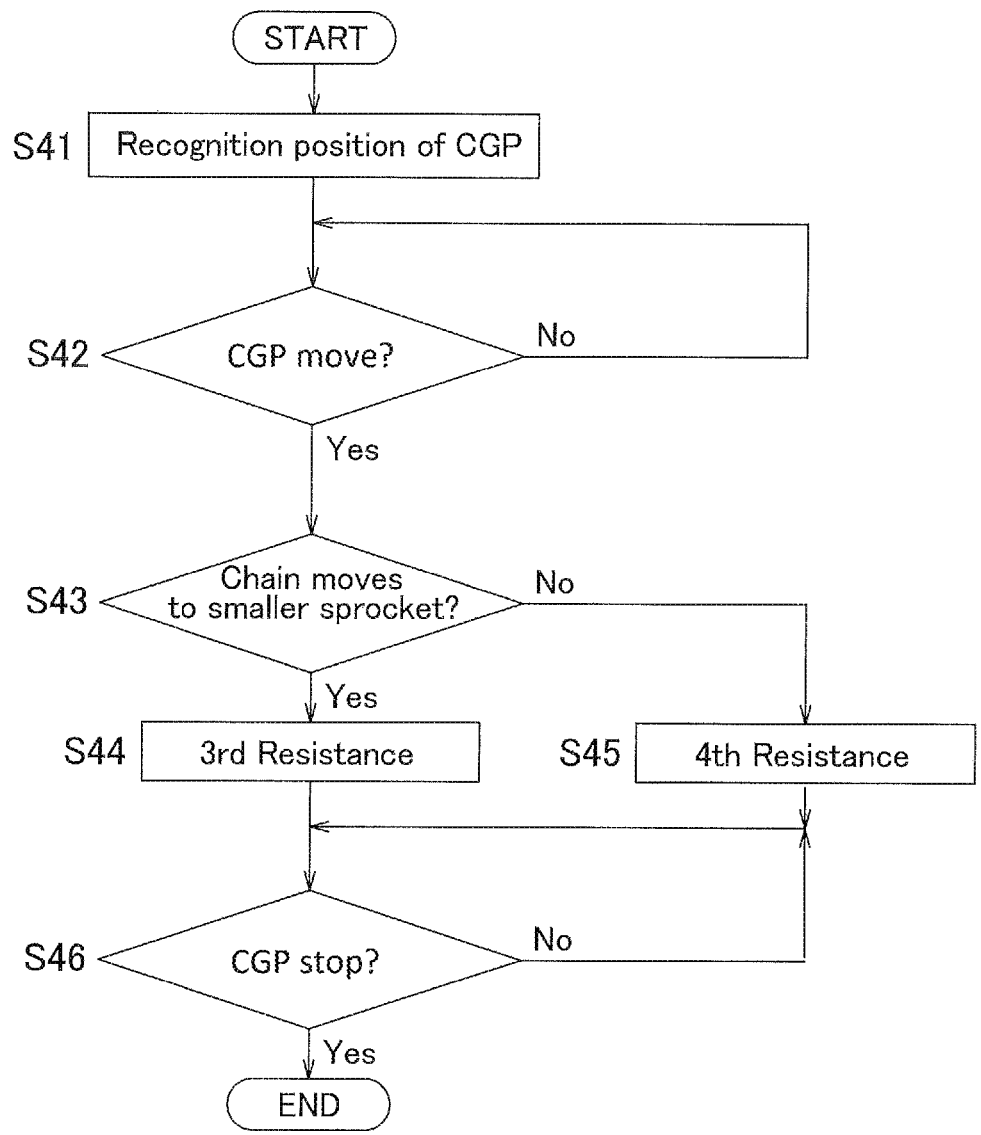
FIG. 12A is a flow chart for explaining the control system of the controller according to a fifth embodiment of the present disclosure.

As shown in FIG. 12A, the controller 51 recognizes position of the chain guide plates 45c with respect to the movable member 43 (S41). The position of the chain guide plates 45c is detected by a detecting device attached to the movable member 43. Thereby, the controller 51 recognizes the present rear sprocket with which the bicycle chain 9 is engaged. The "chain guide plates" are indicated by "CGP" in FIG. 12A.

The controller 51 determines whether the chain guide plates 45c move (S42). In a case when the chain guide plates 45c move (Yes in S42), the controller 51 determines whether the bicycle chain 9 moves from the present rear sprocket to the smaller rear sprocket based on the position of the chain guide plates 45c detected by the detective device (S43). In a case when the chain guide plates 45c don't move (No in S42), the controller 51 repeats the process of step 42 (S42) until the chain guide plates 45c move.

In a case when the bicycle chain 9 moves from the present rear sprocket to the smaller rear sprocket (Yes in S43), the controller 51 controls the electric actuator 49, 149, 253 so that the rotational-force adjustment structure 47, 147, 247 applies the third resistance to the rotation of the chain guide plates 45c via the electric actuator 49, 149, 253 (S44).

In a case when the bicycle chain 9 moves from the present rear sprocket to the larger rear sprocket (No in S43), the controller 51 controls the electric actuator 49, 149, 253 so that the rotational-force adjustment structure 47, 147, 247 applies the fourth resistance to the rotation of the chain guide plates 45c via the electric actuator 49, 149, 253 (S45).

The controller 51 determines whether the chain guide plates 45c stop (S46). In a case when the chain guide plates 45c move (No in S46), the controller 51 repeats steps 44 and 45 (S44 and S45). In a case when the chain guide plates 45c stop (Yes in S46), the controller 51 finishes this process.

This process of the fifth embodiment can be performed separately from the process of the first to fourth embodiments. Also, this process of the fifth embodiment can be performed during the process of the first to fourth embodiments.

Figure 12B:
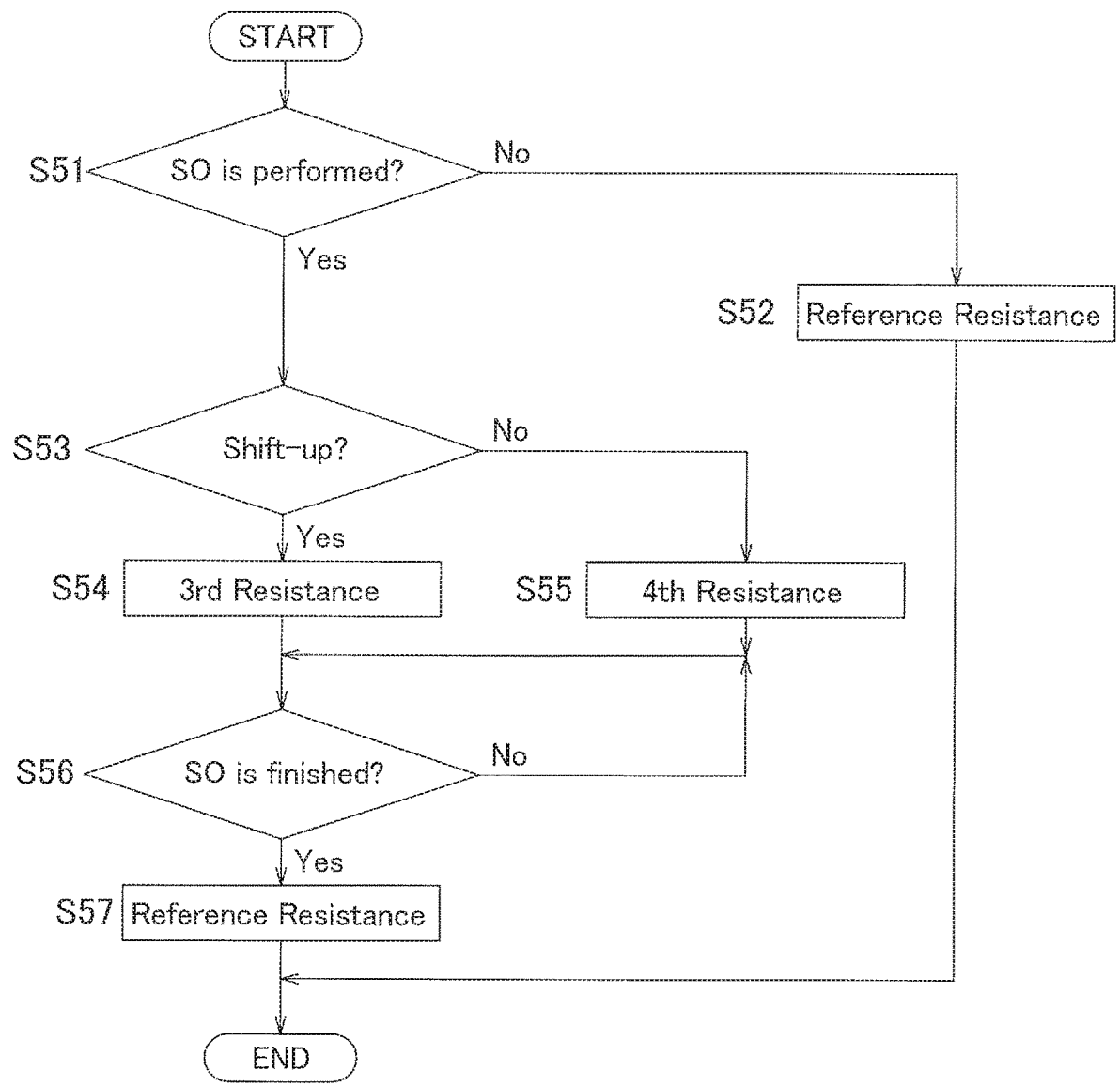
FIG. 12B is a flow chart for explaining the control system of the controller according to the fifth embodiment of the present disclosure.

As shown in FIG. 12B, the control system of the controller 51 can be configured as follows. The controller 51 determines whether the shifting operation is performed (S51). In a case when the shifting operation is not performed (No in S51), the controller 51 controls the electric actuator 49, 149, 253 so that the rotational-force adjustment structure 47, 147, 247 applies the sixth resistance to the rotation of the chain guide plates 45c via the electric actuator 49, 149, 253 (S52).

In a case when the shifting operation is performed (Yes in S51), the controller 51 recognizes whether the shifting operation is shift-up operation (S53).

In a case when the shifting operation is the shift-up operation (Yes in S53), the controller 51 controls the electric actuator 49, 149, 253 so that the rotational-force adjustment structure 47, 147, 247 applies the third resistance to the rotation of the chain guide plates 45c relative to the movable member 43 as described in the above embodiments (S54).

The third resistance can be changed according to size of the rear sprocket with which the bicycle chain 9 engages. For example, in a case when the rear sprocket assembly 28 includes at least three sprockets, the third resistance can decrease as size of the rear sprocket becomes large from the smallest rear sprocket toward the largest rear sprocket.

For example, in a state where the chain tension is high, the chain roller(s) of the bicycle chain 9 may shift from the proper position between the teeth of the rear sprocket. Especially, in a case when the bicycle chain 9 engages with the smaller rear sprocket, the chain roller(s) easily shifts from the proper position.

Thereby, in the state where the chain tension is high, the third resistance is applied to the rotation of the chain guide plates 45c so that the chain roller(s) does not shift from the proper position and the second chain tension T2 increases. As a result, the chain roller(s) of the bicycle chain 9, which is disposed between the teeth of one rear sprocket, is arranged at the proper position.

A large shock may be generated when a shift operation is performed in a state where clearance, which is provided between the rear sprocket tooth and the chain roller(s), is large. But the clearance is appropriately maintained by applying the third resistance. In other words, the chain roller(s) is arranged at a proper interval from the tooth of the downstream side in the driving rotational direction D1 of the rear sprocket assembly 28.

In this state, when the bicycle chain 9 moves from one rear sprocket to another rear sprocket during the shifting operation, the chain roller(s) is suitably disposed between the teeth of the other rear sprocket.

In a case when the shifting operation is not the shift-up operation (No in S53), the controller 51 controls the electric actuator 49, 149, 253 so that the rotational-force adjustment structure 47, 147, 247 applies the fourth resistance to the rotation of the pulley assembly 45 relative to the movable member 43 as described in the above embodiments (S55). The case when the shifting operation is not the shift-up operation corresponds to the case when the shifting operation is a shift-down operation.

The fourth resistance can be changed according to size of the rear sprocket with which the bicycle chain 9 is engaged. For example, in a case when the rear sprocket assembly 28 includes at least three rear sprockets, the fourth resistance can decrease as size of the rear sprocket becomes large from the smallest rear sprocket toward the largest rear sprocket.

Thereby, the second chain tension T2 increases. As a result, the chain roller(s) of the bicycle chain 9, which is disposed between the teeth of one rear sprocket, moves in a direction away from the first pulley 45a along the bicycle chain 9.

For example, in a state where the chain tension is high, the chain roller(s) of the bicycle chain 9 may shift from the proper position between the teeth of the rear sprocket. Especially, in a case when the bicycle chain 9 engages with the smaller rear sprocket, the chain roller(s) easily shifts from the proper position.

Thereby, in the state where the chain tension is high, the fourth resistance is applied to the rotation of the chain guide plates 45c so that the chain roller(s) does not shift from the proper position, and the second chain tension T2 increases. As a result, the chain roller(s) of the bicycle chain 9, which is disposed between the teeth of one rear sprocket, is arranged at the proper position.

A large shock may be generated when a shift operation is performed in a state where clearance, which is provided between the rear sprocket tooth and the chain roller(s), is large. But the clearance is appropriately maintained by applying the fourth resistance. In other words, the chain roller(s) is arranged at proper interval from the tooth of the upstream side in the driving rotational direction D1 of the rear sprocket assembly 28.

In this state, when the bicycle chain 9 moves the bicycle chain 9 from one rear sprocket to another rear sprocket during the shifting operation, the chain roller(s) is suitably disposed between the teeth of the other rear sprocket.

The controller 51 determines whether the bicycle chain 9 is disposed on another rear sprocket (S56). In a case when the bicycle chain 9 is disposed on another rear sprocket (Yes in S56), the controller 51 controls the electric actuator 49, 149, 253 so that the rotational-force adjustment structure 47, 147, 247 applies the reference resistance to the rotation of the chain guide plates 45c (S57).

In a case when the bicycle chain 9 is not disposed on another rear sprocket (No in S56), the controller 51 repeats the process of step 56 (S56) until the bicycle chain 9 is disposed on another rear sprocket.

This process of the fifth embodiment can be performed separately from the process of the first to fourth embodiments. Also, this process of the fifth embodiment can be performed during the process of the first to fourth embodiments.

<Variation of the Fifth Embodiment>

(C1) As a variation of the fifth embodiment, in a case when the bicycle chain 9 engages with the smaller rear sprocket(s), in which size and tooth number thereof are small, the controller 51 can control the electric actuator 49, 149, 253 so that the rotational-force adjustment structure 47, 147, 247 applies the third resistance to the rotation of the chain guide plates 45c relative to the movable member 43.

In a case when the bicycle chain 9 engages with the larger rear sprocket(s), in which size and tooth number thereof are large, the controller 51 can control the electric actuator 49, 149, 253 so that the rotational-force adjustment structure 47,

147, 247 applies the fourth resistance to the rotation of the chain guide plates 45c relative to the movable member 43.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps.

The foregoing also applies to words having similar meanings, such as the terms "including," "having," and their derivatives. Also, the terms "part," "section," "portion," "member," or "element" when used in the singular can have the dual meaning of a single part or a plurality of parts.

Also as used herein to describe the above embodiment(s), the following directional terms "forward," "rearward," "above," "downward," "vertical," "horizontal," "below," and "transverse," as well as any other similar directional terms, refer to those directions of the bicycle derailleur. Accordingly, these terms, as utilized to describe the present technology should be interpreted relative to the bicycle derailleur.

The term "configured" as used herein to describe a component, section, or part of a device implies the existence of other unclaimed or unmentioned components, sections, members or parts of the device to carry out a desired function. The terms of degree such as "substantially," "about," and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired.

Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time.

Every feature which is unique from the prior art, alone or in combination with other features, also should be considered a separate description of further technologies by the applicant, including the structural and/or functional concepts embodied by such feature(s).

Thus, the foregoing descriptions of the embodiments according to the present technologies are provided for illustration only, and not for the purpose of limiting the technology as defined by the appended claims and their equivalents.

The invention claimed is:

1. A bicycle derailleur comprising:
a base member configured to be attached to a bicycle frame;
a movable member configured to move relative to the base member;
a pulley assembly rotatably coupled to the movable member about a first pivot axis;
a rotational-force adjustment structure at least partly disposed between the movable member and the pulley assembly so as to apply resistance to a rotation of the pulley assembly relative to the movable member;
an electric actuator configured to operate the rotational-force adjustment structure; and
a controller configured to control the electric actuator based on driving-force related information, wherein
the rotational-force adjustment structure includes the electric actuator being disposed at one of the movable member and the pulley assembly.

2. The bicycle derailleur according to claim 1, wherein the electric actuator operates the rotational-force adjustment structure so as to adjust the resistance applied by the rotational-force adjustment structure.

3. The bicycle derailleur according to claim 1, wherein the pulley assembly includes at least one pulley configured to engage with a bicycle chain.

4. The bicycle derailleur according to claim 3, wherein the at least one pulley includes a first pulley and a second pulley; and
the first pulley is disposed closer to the movable member than the second pulley.

5. The bicycle derailleur according to claim 4, wherein the first pulley is rotatable about the first pivot axis.

6. The bicycle derailleur according to claim 4, wherein the first pulley is rotatable about a second pivot axis that is offset from the first pivot axis.

7. The bicycle derailleur according to claim 1, wherein the controller controls the electric actuator so that the rotational-force adjustment structure applies a first resistance to the rotation of the pulley assembly relative to the movable member when the driving-force related information relates to a first driving force, and so that the rotational-force adjustment structure applies a second resistance to the rotation of the pulley assembly relative to the movable member when the driving-force related information relates to a second driving force;
the first driving force is larger than the second driving force; and
the first resistance is larger than the second resistance.

8. The bicycle derailleur according to claim 1, wherein the controller controls the electric actuator so that the rotational-force adjustment structure applies a first resistance to the rotation of the pulley assembly relative to the movable member when the driving-force related information is larger than a predetermined threshold.

9. The bicycle derailleur according to claim 8, wherein the controller controls the electric actuator so that the rotational-force adjustment structure applies a second resistance to the rotation of the pulley assembly relative to the movable member when the driving-force related information is equal to or smaller than the predetermined threshold; and
the first resistance is larger than the second resistance.

10. The bicycle derailleur according to claim 1, wherein the pulley assembly is rotatable relative to the movable member in a first rotational direction and in a second rotational direction that is opposite to the first rotational direction; and
the rotational-force adjustment structure applies the resistance to the rotation of the pulley assembly relative to the movable member in the first rotational direction.

11. The bicycle derailleur according to claim 10, wherein the rotational-force adjustment structure does not apply resistance to the rotation of the pulley assembly relative to the movable member in the second rotational direction.

12. The bicycle derailleur according to claim 1, wherein the rotational-force adjustment structure includes a biasing member.

13. The bicycle derailleur according to claim 12, wherein the biasing member has a first end and a second end;

the first end is operatively coupled to the movable member and disposed closer to the movable member than the second end; and the second end is operatively coupled to the pulley assembly and disposed closer to the pulley assembly than the first end.

14. The bicycle derailleur according to claim 13, wherein the electric actuator is configured to move one of the first end and the second end relative to the other of the first end and the second end so that the resistance is applied to the rotation of the pulley assembly relative to the movable member.

15. The bicycle derailleur according to claim 1, wherein the rotational-force adjustment structure includes a one-way clutch mechanism and a resistance applying member;

the one-way clutch mechanism includes a first member and a second member facing the first member, and is configured to permit relative movement between the first member and the second member in a first direction and to inhibit the relative movement between the first member and the second member in a second direction that is opposite to the first direction; and the resistance applying member is configured to indirectly or directly apply the resistance to one of the first member and the second member.

16. The bicycle derailleur according to claim 15, wherein the electric actuator is configured to operate the resistance applying member so that the resistance is applied to the rotation of the pulley assembly relative to the movable member.

17. The bicycle derailleur according to claim 1, wherein the resistance includes a third resistance and a fourth resistance;

the controller controls the electric actuator so that the rotational-force adjustment structure applies the third resistance to the rotation of the pulley assembly relative to the movable member when a bicycle chain engages with a smaller rear sprocket, and so that the rotational-force adjustment structure applies the fourth resistance to the rotation of the pulley assembly relative to the movable member when the bicycle chain engages with a larger rear sprocket; and the third resistance is larger than the fourth resistance.

18. The bicycle derailleur according to claim 1, wherein the resistance includes a fifth resistance and a sixth resistance;

the controller controls the electric actuator so that the rotational-force adjustment structure applies the fifth resistance to the rotation of the pulley assembly relative to the movable member during a shifting operation, and so that the rotational-force adjustment structure applies the sixth resistance to the rotation of the pulley assembly relative to the movable member during a non-shifting operation; and the fifth resistance is larger than the sixth resistance.

19. A bicycle derailleur comprising:

a base member configured to be attached to a bicycle frame;

a movable member configured to move relative to the base member;

a pulley assembly rotatably coupled to the movable member about a first pivot axis;

a rotational-force adjustment structure disposed between the movable member and the pulley assembly;

an electric actuator configured to operate the rotational-force adjustment structure so as to apply resistance to a rotation of the pulley assembly relative to the movable member; and a controller configured to control the electric actuator so that the rotational-force adjustment structure applies a larger resistance to the rotation of the pulley assembly relative to the movable member when a bicycle chain engages with a smaller rear sprocket, and so that the rotational-force adjustment structure applies a smaller resistance to the rotation of the pulley assembly relative to the movable member when the bicycle chain engages with a larger rear sprocket, wherein the rotational-force adjustment structure includes the electric actuator being disposed at one of the movable member and the pulley assembly.

20. A bicycle derailleur comprising:

a base member configured to be attached to a bicycle frame;

a movable member configured to move relative to the base member;

a pulley assembly rotatably coupled to the movable member about a first pivot axis;

a rotational-force adjustment structure disposed between the movable member and the pulley assembly;

an electric actuator configured to operate the rotational-force adjustment structure so as to apply resistance to a rotation of the pulley assembly relative to the movable member; and a controller configured to control the electric actuator so that the rotational-force adjustment structure applies a larger resistance to the rotation of the pulley assembly relative to the movable member during a shifting operation, and so that the rotational-force adjustment structure applies a smaller resistance to the rotation of the pulley assembly relative to the movable member during a non-shifting operation, wherein the rotational-force adjustment structure includes the electric actuator being disposed at one of the movable member and the pulley assembly.

* * * * *